United States Patent
Tsai et al.

(10) Patent No.: US 9,442,276 B2
(45) Date of Patent: Sep. 13, 2016

(54) PHOTOGRAPHING OPTICAL LENS SYSTEM

(71) Applicant: LARGAN PRECISION CO., LTD., Taichung (TW)

(72) Inventors: Tsung-Han Tsai, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 775 days.

(21) Appl. No.: 13/692,246

(22) Filed: Dec. 3, 2012

(65) Prior Publication Data

US 2014/0078581 A1 Mar. 20, 2014

(30) Foreign Application Priority Data

Sep. 14, 2012 (TW) .............................. 101133623 A

(51) Int. Cl.
 *G02B 9/34* (2006.01)
 *G02B 13/18* (2006.01)
 *G02B 13/14* (2006.01)
 *G02B 13/00* (2006.01)

(52) U.S. Cl.
 CPC ................. *G02B 13/14* (2013.01); *G02B 9/34* (2013.01); *G02B 13/004* (2013.01); *G02B 13/18* (2013.01)

(58) Field of Classification Search
 CPC .......... G02B 9/00; G02B 9/34; G02B 13/00; G02B 13/001; G02B 13/0015; G02B 13/002; G02B 13/004; G02B 13/008; G02B 13/14
 See application file for complete search history.

(56) References Cited

U.S. PATENT DOCUMENTS

| | | | | |
|---|---|---|---|---|
| 7,466,497 B2 * | 12/2008 | Park | .................... | G02B 9/34 359/715 |
| 7,636,205 B2 * | 12/2009 | Yamamoto | ............... | G02B 9/34 359/740 |
| 7,848,032 B1 * | 12/2010 | Chen et al. | .................. | 359/715 |
| 2012/0099009 A1 * | 4/2012 | Hsu | ...................... | G02B 13/004 348/294 |
| 2012/0154905 A1 * | 6/2012 | Tsai | ...................... | G02B 13/004 359/357 |
| 2012/0170140 A1 * | 7/2012 | Hsieh et al. | .................. | 359/716 |
| 2013/0278714 A1 | 10/2013 | Hirose | | |

FOREIGN PATENT DOCUMENTS

JP 2004-302057 10/2004

* cited by examiner

*Primary Examiner* — Thong Nguyen
(74) *Attorney, Agent, or Firm* — Locke Lord LLP; Tim Tingkang Xia, Esq.

(57) ABSTRACT

This invention provides a photographing optical lens system comprising: a first lens element with negative refractive power; a second lens element with positive refractive power having a concave object-side surface at paraxial region and a convex image-side surface at paraxial region; a third lens element with positive refractive power having a concave object-side surface at paraxial region and a convex image-side surface at paraxial region; and a fourth lens element with positive refractive power having a convex object-side surface at paraxial region and a concave image-side surface at paraxial region and a convex shape at peripheral region, and both surfaces being aspheric. The photographing optical lens system further satisfies conditional expressions as specified.

28 Claims, 25 Drawing Sheets

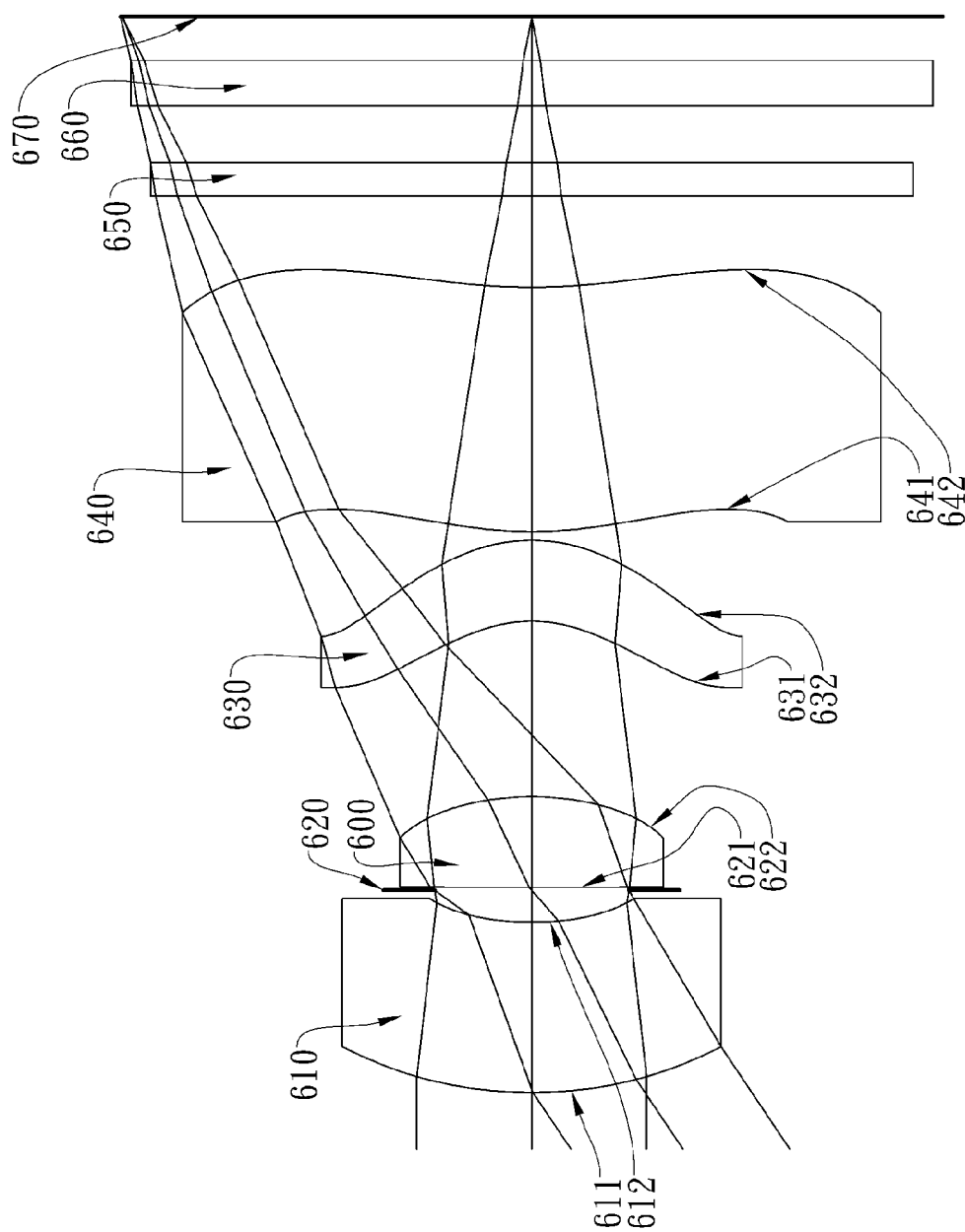

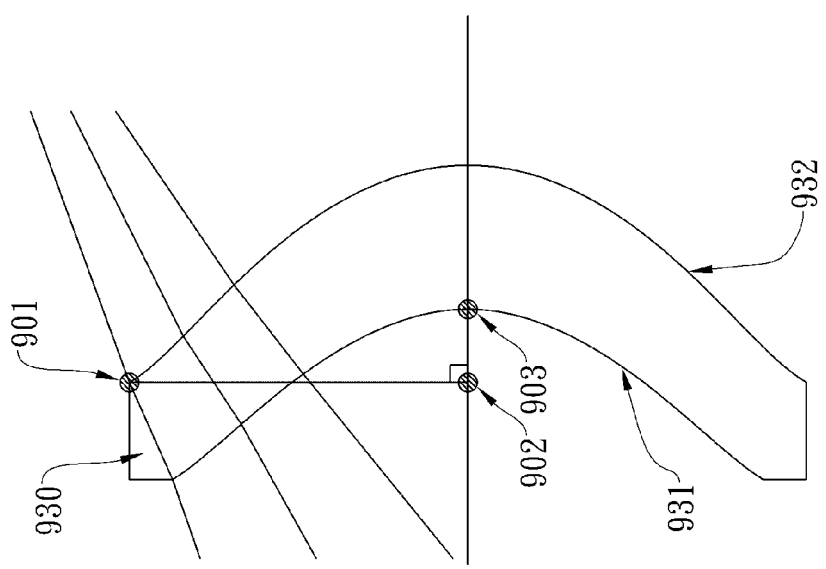

PHOTOGRAPHING OPTICAL LENS SYSTEM

CROSS-REFERENCE TO RELATED APPLICATION

This non-provisional application claims priority under 35 U.S.C. §119(a) on Patent Application No. 101133623 filed in Taiwan (R.O.C.) on Sep. 14, 2012, the entire contents of which are hereby incorporated by reference.

BACKGROUND OF THE INVENTION

1. Field of the Invention

The present invention relates to a photographing optical lens system, and more particularly, to a photographing optical lens system used in electronic products for infrared band or visible light band.

2. Description of the Related Art

In recent years, the application of imaging lens systems is getting more and more popular, especially in computer webcams, automotive lens assemblies, surveillance cameras, and electronic game devices. Generally, the sensor of a general photographing camera is none other than CCD (Charge Coupled Device) or CMOS device (Complementary Metal Oxide Semiconductor device). Along with the advances in semiconductor manufacturing technology, the pixel size of sensors is reduced leading compact imaging lens systems to higher resolution. In the meantime, the demand for better image quality is also increased.

The wavelength range of visible light is generally between 400 and 700 nm, wherein the region of infrared light from 700 to 2000 nm is called the NIR (Near Infra-red, NIR) wavelength range, which is not detectable by the naked eyes. Since NIR has advantages of being less likely to be affected by interferences, lower cost and power consumption, and being highly secretive (less likely to be recognized by the naked eye), it is applied in many electronic technologies to develop various electronic products, such as remote control devices, infrared monitors and infrared detector systems. Also, the emerging motion capture technology applied in smart TV or motion sensing games also expands the application of compact imaging lens. The feature of these applications is by an infrared camera directly capturing the user's motion, the user takes control of the device intuitively; the experience of the motion sensing operation is elevated. Therefore, the demand for compact imaging lenses operated in the infrared wavelength range has increased; furthermore, lenses with wider viewing angles are even more favorable because they can extend the capturing range of the camera.

In view of this, an imaging lens structure applied in portable electronic devices is needed, which has a longer back focal length and the depression of the chief ray angle (CRA) for the better response performance of the sensor and has an efficient back focal length for disposing a filter element or a wavelength selector accordingly. On one hand, imaging lenses with this structure can be optimized for the requirement of the conventional photography (sufficient viewing angle, large aperture, image quality, etc.). On the other hand, lenses with this structure can be optimized for the requirement of the infrared photography, and designed for particular applications (such as the infrared imaging or motion capturing, etc.) at locations in low light conditions.

SUMMARY OF THE INVENTION

The present invention provides a photographing optical lens system, in order from an object side to an image side comprising: a first lens element with negative refractive power; a second lens element with positive refractive power having a concave object-side surface at paraxial region and a convex image-side surface at paraxial region; a third lens element with positive refractive power having a concave object-side surface at paraxial region and a convex image-side surface at paraxial region; and a fourth lens element with positive refractive power having a convex object-side surface at paraxial region, a concave image-side surface at paraxial region and a convex shape at peripheral region, and both of the object-side and image-side surfaces thereof being aspheric; wherein the lens elements of the photographing optical lens system with refractive power are the first lens element, the second lens element, the third lens element, and the fourth lens element; wherein an axial distance between the first lens element and the second lens element is T12, an axial distance between the second lens element and the third lens element is T23, and they satisfy the following relations: $0.05 < T12/T23 < 0.52$.

In another aspect, the present invention provides a photographing optical lens system, in order from an object side to an image side comprising: a first lens element with negative refractive power; a second lens element with positive refractive power having a convex image-side surface at paraxial region; a third lens element with positive refractive power having a concave object-side surface at paraxial region and a convex image-side surface at paraxial region; and a fourth lens element with positive refractive power having a convex object-side surface at paraxial region, a concave image-side surface at paraxial region and a convex shape at peripheral region, and both of the object-side and image-side surfaces thereof being aspheric; wherein the lens elements of the photographing optical lens system with refractive power are the first lens element, the second lens element, the third lens element, and the fourth lens element; wherein an axial distance between the first lens element and the second lens element is T12, an axial distance between the second lens element and the third lens element is T23, a curvature radius of the image-side surface of the second lens element is R4, a focal length of the photographing optical lens system is f, and they satisfy the following relations: $0.05 < T12/T23 < 0.52$; and $-1.5 < R4/f < 0$.

In still another aspect, the present invention provides a photographing optical lens system, in order from an object side to an image side comprising: a first lens element with negative refractive power having a convex object-side surface at paraxial region and a concave image-side surface at paraxial region; a second lens element with positive refractive power having a convex image-side surface at paraxial region; a third lens element with positive refractive power having a concave object-side surface at paraxial region and a convex image-side surface at paraxial region; and a fourth lens element with positive refractive power having a convex object-side surface at paraxial region, and both of the object-side and image-side surfaces thereof being aspheric, a distance in parallel with an optical axis from a point on the image-side surface of the fourth lens element to an axial vertex on the image-side surface of the fourth lens element is Sag42, a second derivative of the distance Sag42 with respect to a height perpendicular to the optical axis from the point on the image-side surface of the fourth lens element to the optical axis is DDsag42, and DDsag42 changes from positive to negative or vice versa at least once; wherein the lens elements of the photographing optical lens system with refractive power are the first lens element, the second lens element, the third lens element, and the fourth lens element; wherein an axial distance between the first lens element and the second lens element is T12, an axial distance between the second lens element and the third lens element is T23, a curvature radius of the image-side surface of the second lens element is R4, a focal length of the photographing optical lens system is f, a refractive index of the first lens element is N1, a refractive index of the second lens element is N2, a refractive index of the third lens element is N3, a refractive index of the fourth lens element is N4, and they satisfy the following relations: $0.05<T12/T23<0.75$; $-1.5<R4/f<0$; and $0.80<(N1*N2)/(N3*N4)<1.20$.

In yet another aspect, the present invention provides a photographing optical lens system, in order from an object side to an image side comprising: a first lens element with negative refractive power having a convex object-side surface at paraxial region and a concave image-side surface at paraxial region; a second lens element with positive refractive power having a convex image-side surface at paraxial region; a third lens element with positive refractive power having a concave object-side surface at paraxial region and a convex image-side surface at paraxial region; and a fourth lens element with positive refractive power having a convex object-side surface at paraxial region, a concave image-side surface at paraxial region and a convex shape at peripheral region, and both of the object-side and image-side surfaces thereof being aspheric; wherein the lens elements of the photographing optical lens system with refractive power are the first lens element, the second lens element, the third lens element, and the fourth lens element; wherein the photographing optical lens system is used for optical wavelengths ranging from 780 nm to 950 nm; wherein a refractive index of the first lens element is N1, a refractive index of the second lens element is N2, a refractive index of the third lens element is N3, a refractive index of the fourth lens element is N4, and they satisfy the following relations: $0.80<(N1*N2)/(N3*N4)<1.20$.

The first lens element with negative refractive power allows the field of view of the system to be favorably enlarged, the object-side surface of the first lens element is convex at the paraxial region and the image-side surface of the first lens element is concave at the paraxial region, which allows the field of view of the system to be favorably adjusted and avoid excessive aberrations of the lens system.

The second lens element has positive refractive power and forms a retro-focus structure with the first lens element with negative refractive power to have a longer back focal length providing the main refractive power of the system. The object-side surface of the second lens element is concave at the paraxial region and the image-side surface of the second lens element is convex at the paraxial region, which allows the astigmatism of the system to be favorably corrected.

The third lens element has positive refractive power and can favorably attenuate the sensitivity of the imaging lens system. The object-side surface of the third lens element is concave at the paraxial region and the image-side surface of the third lens element is convex at the paraxial region, which effectively reduces the distortion by the surface design of the third lens element.

The fourth lens element has positive refractive power to strengthen the retro-focus design of the first-second lens structure to have a longer back focal length of the system, and provides the main refractive power of the system, which supplies the depression of the chief ray angle (CRA) for the better response performance of the sensor. The object-side surface of the fourth lens element is convex at the paraxial region and the image-side surface of the fourth lens element is concave at the paraxial region, which allows the astigmatism of the system to be favorably corrected. When the fourth lens element has a concave image-side surface at paraxial region and a convex shape at peripheral region, the incident angle at which rays from the off-axis field enter the sensor can be effectively reduced and aberrations of the off-axis field can be further corrected.

By such arrangement, the lens system of the invention has a longer back focal length and the depression of the chief ray angle (CRA) for the better response performance of the sensor. Therefore, more back focal length can dispose additional optical elements (such as filter element or wavelength selector) for application in the field of the optical system with particular wavelength range (such as infrared light).

BRIEF DESCRIPTION OF THE DRAWINGS

FIG. 6A shows a photographing optical lens system in accordance with the sixth embodiment of the present invention.

FIG. 9 shows the point projected onto the optical axis from a maximum effective diameter position on the image-side surface of the third lens element is closer to the object side than an axial vertex on the object-side surface of the third lens element.

DETAILED DESCRIPTION OF THE PREFERRED EMBODIMENTS

Figure 1A:
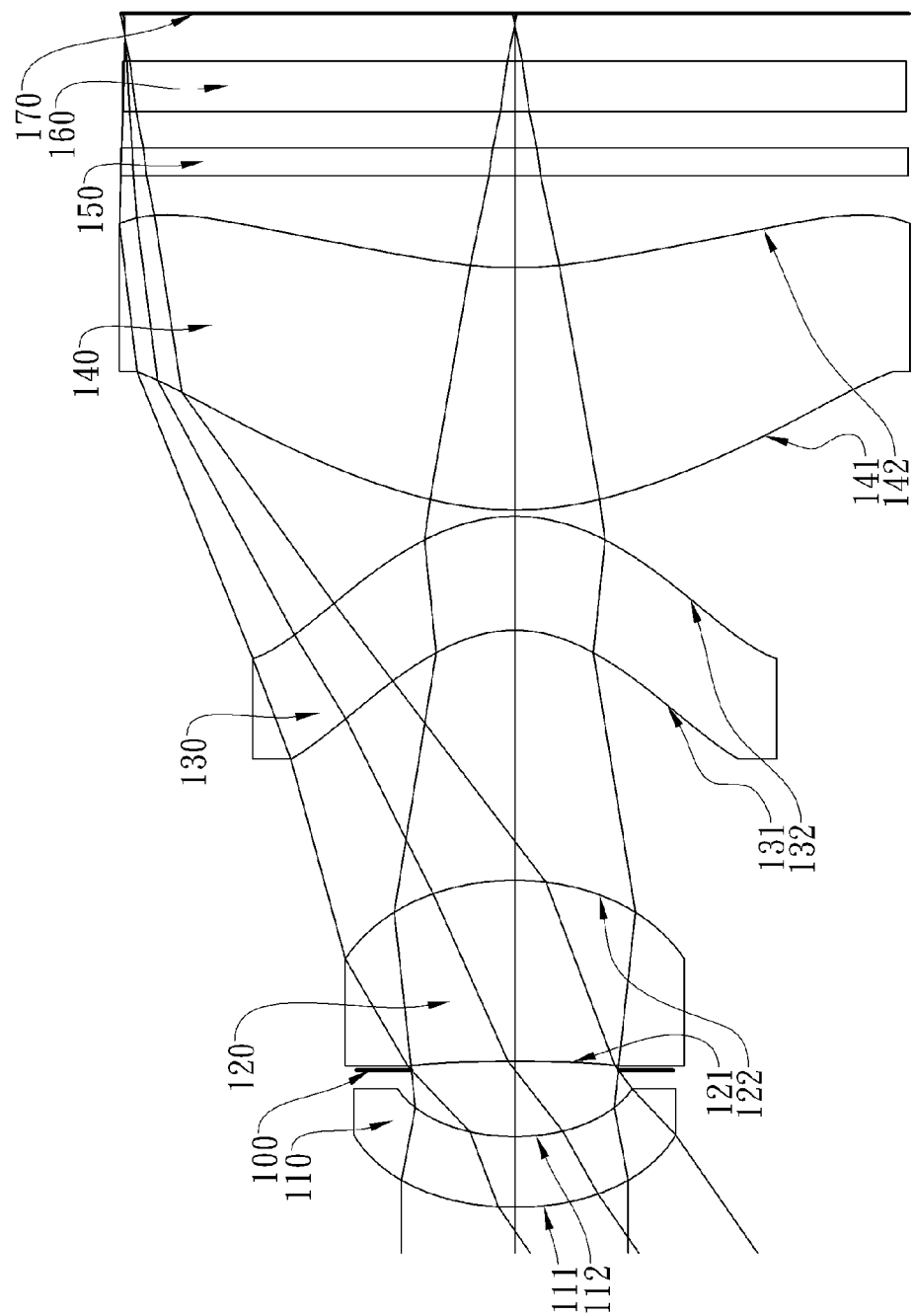
FIG. 1A shows a photographing optical lens system in accordance with the first embodiment of the present invention.

The present invention provides a photographing optical lens system, in order from an object side to an image side comprising: a first lens element with negative refractive power; a second lens element with positive refractive power having a concave object-side surface at paraxial region and a convex image-side surface at paraxial region; a third lens element with positive refractive power having a concave object-side surface at paraxial region and a convex image-side surface at paraxial region; and a fourth lens element with positive refractive power having a convex object-side surface at paraxial region, a concave image-side surface at paraxial region and a convex shape at peripheral region, and both of the object-side and image-side surfaces thereof being aspheric; wherein the lens elements of the photographing optical lens system with refractive power are the first lens element, the second lens element, the third lens element, and the fourth lens element; wherein an axial distance between the first lens element and the second lens element is T12, an axial distance between the second lens element and the third lens element is T23, and they satisfy the following relations: $0.05<T12/T23<0.52$.

When the relation of $0.05<T12/T23<0.52$ is satisfied, the spacing distance between the lens elements is more suitable for the manufacture of the lens elements, and thereby the yield rate of the product is raised; preferably, the following relation is satisfied: $0.12<T12/T23<0.40$.

In the aforementioned photographing optical lens system, a refractive index of the first lens element is N1, a refractive index of the second lens element is N2, a refractive index of the third lens element is N3, a refractive index of the fourth lens element is N4, when they satisfy the following relation: $0.80<(N1*N2)/(N3*N4)<1.20$, the aberrations of the system is favorably improved; preferably, they satisfy the following relation: $0.90<(N1*N2)/(N3*N4)<1.14$.

In the aforementioned photographing optical lens system, a focal length of the photographing optical lens system is f, a focal length of the third lens element is f3, a focal length of the fourth lens element is f4; preferably, they satisfy the following relation: $0<|f/f3|+|f/f4|<0.80$, which is favorable for strengthening the retro-focus design of the third lens element and the fourth lens element structure to have a longer back focal length of the system.

In the aforementioned photographing optical lens system, a curvature radius of the image-side surface of the second lens element is R4, a focal length of the photographing optical lens system is f; preferably, they satisfy the following relation: $-0.80<R4/f<0$, which is favorable for adjusting the refractive power of the second lens element to make the allocation of the positive refractive power more balanced.

In the aforementioned photographing optical lens system, a curvature radius of the object-side surface of the third lens element is R5, a curvature radius of the image-side surface of the third lens element is R6; preferably, they satisfy the following relation: $0<|(R5-R6)/(R5+R6)|<0.25$, which is more suitable for the curvature of the third lens element and further corrects the astigmatism of the system.

The photographing optical lens system further comprises a stop disposed between the first lens element and the second lens element, an axial distance between the stop and the image-side surface of the fourth lens element is SD, with the direction toward the image-side side defined as positive or vice versa, an axial distance between the object-side surface of the first lens element and the image-side surface of the fourth lens element is TD; preferably, they satisfy the following relation: $0.65<SD/TD<0.90$, which is favorable for the photographing optical lens system's having a good balance between the telecentric property and wide field of view.

In the aforementioned photographing optical lens system, a central thickness of the third lens element is CT3, a central thickness of the first lens element is CT1, and they satisfy the following relation: $0.20<CT3/CT1<2.0$, which is more suitable for the thickness of the lens elements and is favorable for the molding and uniformity of the lens during plastic injection molding, and thereby avoiding the difficulty during assembling.

In the aforementioned photographing optical lens system; preferably, the photographing optical lens system is applicable for the wavelength range of 780 nm to 950 nm. That is, the photographing optical lens system is suitable for applications at infrared band.

In another aspect, the present invention provides a photographing optical lens system, in order from an object side to an image side comprising: a first lens element with negative refractive power; a second lens element with positive refractive power having a convex image-side surface at paraxial region; a third lens element with positive refractive power having a concave object-side surface at paraxial region and a convex image-side surface at paraxial region; and a fourth lens element with positive refractive power having a convex object-side surface at paraxial region, a concave image-side surface at paraxial region and a convex shape at peripheral region, and both of the object-side and image-side surfaces thereof being aspheric; wherein the lens elements of the photographing optical lens system with refractive power are the first lens element, the second lens element, the third lens element, and the fourth lens element; wherein an axial distance between the first lens element and the second lens element is T12, an axial distance between the second lens element and the third lens element is T23, a curvature radius of the image-side surface of the second lens element is R4, a focal length of the photographing optical lens system is f, and they satisfy the following relations: $0.05<T12/T23<0.52$; and $-1.5<R4/f<0$.

When the relation of $0.05<T12/T23<0.52$ is satisfied, the spacing distance between the lens elements is more suitable for the manufacture of the lens elements, and thereby the yield rate of the product is raised.

When the relation of $-1.5<R4/f<0$ is satisfied, the refractive power of the second lens element is favorably adjusted to make the allocation of the positive refractive power more balanced; preferably, the following relation is satisfied: −0.80<R4/f<0.

In the aforementioned photographing optical lens system, the focal length of the photographing optical lens system is f, a focal length of the third lens element is f3, a focal length of the fourth lens element is f4; preferably, they satisfy the following relation: 0<|f/f3|+|f/f4|<0.80, which is favorable for strengthening the retro-focus design of the third lens element and the fourth lens element structure to have a longer back focal length of the system.

In the aforementioned photographing optical lens system, a curvature radius of the object-side surface of the third lens element is R5, a curvature radius of the image-side surface of the third lens element is R6; preferably, they satisfy the following relation: 0<|(R5−R6)/(R5+R6)|<0.25, which is more suitable for the curvature of the third lens element and further corrects the astigmatism of the system.

In the aforementioned photographing optical lens system; preferably, the photographing optical lens system is applicable for the wavelength range of 780 nm to 950 nm. That is, the photographing optical lens system is suitable for applications at infrared band.

In the aforementioned photographing optical lens system, a central thickness of the third lens element is CT3, a central thickness of the first lens element is CT1, and they satisfy the following relation: 0.20<CT3/CT1<2.0, which is more suitable for the thickness of the lens elements and is favorable for the molding and uniformity of the lens during plastic injection molding, and thereby avoiding the difficulty during assembling.

The photographing optical lens system further comprises a stop disposed between the first lens element and the second lens element, an axial distance between the stop and the image-side surface of the fourth lens element is SD, with the direction toward the image-side side defined as positive or vice versa, an axial distance between the object-side surface of the first lens element and the image-side surface of the fourth lens element is TD; preferably, they satisfy the following relation: 0.65<SD/TD<0.90, which is favorable for the photographing optical lens system's having a good balance between the telecentric property and wide field of view.

In the aforementioned photographing optical lens system, a refractive index of the first lens element is N1, a refractive index of the second lens element is N2, a refractive index of the third lens element is N3, a refractive index of the fourth lens element is N4; preferably, they satisfy the following relation: 0.80<(N1*N2)/(N3*N4)<1.20, the aberrations of the system is favorably improved.

In yet another aspect, the present invention provides a photographing optical lens system, in order from an object side to an image side comprising: a first lens element with negative refractive power having a convex object-side surface at paraxial region and a concave image-side surface at paraxial region; a second lens element with positive refractive power having a convex image-side surface at paraxial region; a third lens element with positive refractive power having a concave object-side surface at paraxial region and a convex image-side surface at paraxial region; and a fourth lens element with positive refractive power having a convex object-side surface at paraxial region, and both of the object-side and image-side surfaces thereof being aspheric, a distance in parallel with an optical axis from a point on the image-side surface of the fourth lens element to an axial vertex on the image-side surface of the fourth lens element is Sag42, a second derivative of the distance Sag42 with respect to a height perpendicular to the optical axis from the point on the image-side surface of the fourth lens element to the optical axis is DDsag42, and DDsag42 changes from positive to negative or vice versa at least once; wherein the lens elements of the photographing optical lens system with refractive power are the first lens element, the second lens element, the third lens element, and the fourth lens element; wherein an axial distance between the first lens element and the second lens element is T12, an axial distance between the second lens element and the third lens element is T23, a curvature radius of the image-side surface of the second lens element is R4, a focal length of the photographing optical lens system is f, a refractive index of the first lens element is N1, a refractive index of the second lens element is N2, a refractive index of the third lens element is N3, a refractive index of the fourth lens element is N4, and they satisfy the following relations: 0.05<T12/T23<0.75; −1.5<R4/f<0; and 0.80<(N1*N2)/(N3*N4)<1.2.

When the relation of 0.05<T12/T23<0.75 is satisfied, the spacing distance between the lens elements is more suitable for the manufacture of the lens elements, and thereby the yield rate of the product is raised.

When the relation of −1.5<R4/f<0 is satisfied, the refractive power of the second lens element is favorably adjusted to make the allocation of the positive refractive power more balanced.

When the relation of 0.80<(N1*N2)/(N3*N4)<1.2 is satisfied, the aberrations of the system is favorably improved; preferably, the following relation is satisfied: 0.90<(N1*N2)/(N3*N4)<1.14.

The photographing optical lens system further comprises a stop disposed between the first lens element and the second lens element, an axial distance between the stop and the image-side surface of the fourth lens element is SD, with the direction toward the image-side side defined as positive or vice versa, an axial distance between the object-side surface of the first lens element and the image-side surface of the fourth lens element is TD; preferably, they satisfy the following relation: 0.65<SD/TD<0.90, which is favorable for the photographing optical lens system's having a good balance between the telecentric property and wide field of view.

In the aforementioned photographing optical lens system, the focal length of the photographing optical lens system is f, a focal length of the third lens element is f3, a focal length of the fourth lens element is f4; preferably, they satisfy the following relation: 0<|f/f3|+|f/f4|<0.80, which is favorable for strengthening the retro-focus design of the third lens element and the fourth lens element structure to have a longer back focal length of the system.

In the aforementioned photographing optical lens system, a curvature radius of the object-side surface of the third lens element is R5, a curvature radius of the image-side surface of the third lens element is R6; preferably, they satisfy the following relation: 0<|(R5−R6)/(R5+R6)|<0.25, which is more suitable for the curvature of the third lens element and further corrects the astigmatism of the system.

In the aforementioned photographing optical lens system; preferably, the photographing optical lens system is applicable for the wavelength range of 780 nm to 950 nm. That is, the photographing optical lens system is suitable for applications at infrared band.

In another aspect, the present invention provides a photographing optical lens system, in order from an object side to an image side comprising: a first lens element with negative refractive power having a convex object-side surface at paraxial region and a concave image-side surface at paraxial region; a second lens element with positive refractive power having a convex image-side surface at paraxial region; a third lens element with positive refractive power having a concave object-side surface at paraxial region and a convex image-side surface at paraxial region; and a fourth lens element with positive refractive power having a convex object-side surface at paraxial region, a concave image-side surface at paraxial region and a convex shape at peripheral region, and both of the object-side and image-side surfaces thereof being aspheric; wherein the lens elements of the photographing optical lens system with refractive power are the first lens element, the second lens element, the third lens element, and the fourth lens element; wherein the photographing optical lens system is used for optical wavelengths ranging from 780 nm to 950 nm; wherein a refractive index of the first lens element is N1, a refractive index of the second lens element is N2, a refractive index of the third lens element is N3, a refractive index of the fourth lens element is N4, and they satisfy the following relations: $0.80<(N1*N2)/(N3*N4)<1.20$.

When the relation of $0.80<(N1*N2)/(N3*N4)<1.20$ is satisfied, the aberrations of the system is favorably improved.

In the aforementioned photographing optical lens system, an axial distance between the first lens element and the second lens element is T12, an axial distance between the second lens element and the third lens element is T23; preferably, they satisfy the following relation: $0.05<T12/T23<0.52$, the spacing distance between the lens elements is more suitable for the manufacture of the lens elements, and thereby the yield rate of the product is raised.

In the aforementioned photographing optical lens system, a central thickness of the third lens element is CT3, a central thickness of the first lens element is CT1, and they satisfy the following relation: $0.20<CT3/CT1<2.0$, which is more suitable for the thickness of the lens elements and is favorable for the molding and uniformity of the lens during plastic injection molding, and thereby avoiding the difficulty during assembling.

In the aforementioned photographing optical lens system, a curvature radius of the object-side surface of the third lens element is R5, a curvature radius of the image-side surface of the third lens element is R6; preferably, they satisfy the following relation: $0<|(R5-R6)/(R5+R6)|<0.25$, which is more suitable for the curvature of the third lens element and further corrects the astigmatism of the system.

The photographing optical lens system further comprises a stop disposed between the first lens element and the second lens element, an axial distance between the stop and the image-side surface of the fourth lens element is SD, with the direction toward the image-side side defined as positive or vice versa, an axial distance between the object-side surface of the first lens element and the image-side surface of the fourth lens element is TD; preferably, they satisfy the following relation: $0.65<SD/TD<0.90$, which is favorable for the photographing optical lens system's having a good balance between the telecentric property and wide field of view.

In the aforementioned photographing optical lens system, a distance in parallel with an optical axis from a point on the image-side surface of the fourth lens element to an axial vertex on the image-side surface of the fourth lens element is Sag42, a second derivative of the distance Sag42 with respect to a height perpendicular to the optical axis from the point on the image-side surface of the fourth lens element to the optical axis is DDsag42; preferably, DDsag42 changes from positive to negative or vice versa at least once, the incident angle at which rays from the off-axis field enter the sensor can be effectively reduced and the aberrations of the off-axis field can be further corrected.

In the aforementioned photographing optical lens system, a curvature radius of the image-side surface of the second lens element is R4, a focal length of the photographing optical lens system is f; preferably, they satisfy the following relation: $-0.80<R4/f<0$, which is favorable for adjusting the refractive power of the second lens element to make the allocation of the positive refractive power more balanced.

In the photographing optical lens system of the present invention, the lens elements can be made of glass or plastic materials. If the lens elements are made of glass, the freedom for distributing the refractive power of the photographing optical lens system can be increased. If plastic material is adopted to produce the lens elements, the production cost will be reduced effectively; additionally, the surfaces of the lens elements can be aspheric and easily made into non-spherical profiles, allowing more design parameters which can be used to reduce aberrations and the number of the lens elements used in an optical system. Consequently, the total track length of the photographing optical lens system can be effectively reduced.

In the photographing optical lens system of the present invention, there can be at least one stop provided, such as an aperture stop, a glare stop or a field stop. Said glare stop or said field stop is for eliminating the stray light and thereby improving the image resolution thereof.

In the photographing optical lens system of the present invention, the stop can be configured as a front stop or a middle stop. A front stop can provide a longer distance between an exit pupil of the system and an image plane which can improve the image-sensing efficiency of an image sensor, such as CCD or CMOS. On the other hand, a middle stop is favorable for enlarging the field of view of the system as well as providing features associated with a wider field of view.

In the photographing optical lens system of the present invention, if a lens element is described to have a convex surface, it means the portion of the surface in proximity to the optical axis is convex; if a lens element is described to have a concave surface, it means the portion of the surface in proximity to the optical axis is concave. In the photographing optical lens system of the present invention, if a surface of a lens element is described to have an inflection point, the second derivative of the sag of said surface switches signs once.

In the photographing optical lens system of the present invention can be applied to optical systems that perform focusing by the movement of lens elements and zoom optical systems according to needs. Moreover, the assembly of the present invention is characterized by excellent aberration correction capability and good image quality, and is applicable to various electronic imaging systems including 3D (three-dimensional) image capturing systems, digital cameras, mobile devices and digital tablets.

Please refer to FIG. 9, a point 902 projected onto the optical axis from a maximum effective diameter position 901 on the image-side surface 932 of the third lens element 930 is closer to the object side than an axial vertex 903 on the object-side surface 931 of the third lens element 930.

The photographing optical lens system of the present invention will be detailed by the following embodiments accompanied by the drawings.

Embodiment 1

Figure 1B:
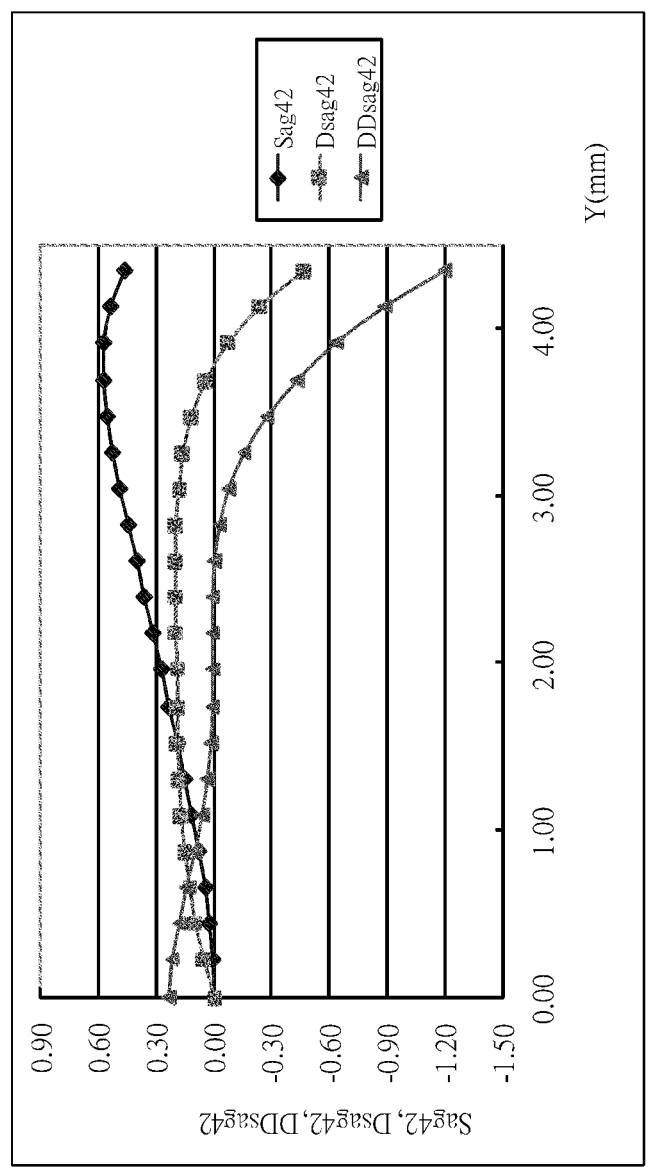
FIG. 1B shows the object-side surface characteristics of the third lens element of the first embodiment of the present invention.
Figure 1C:
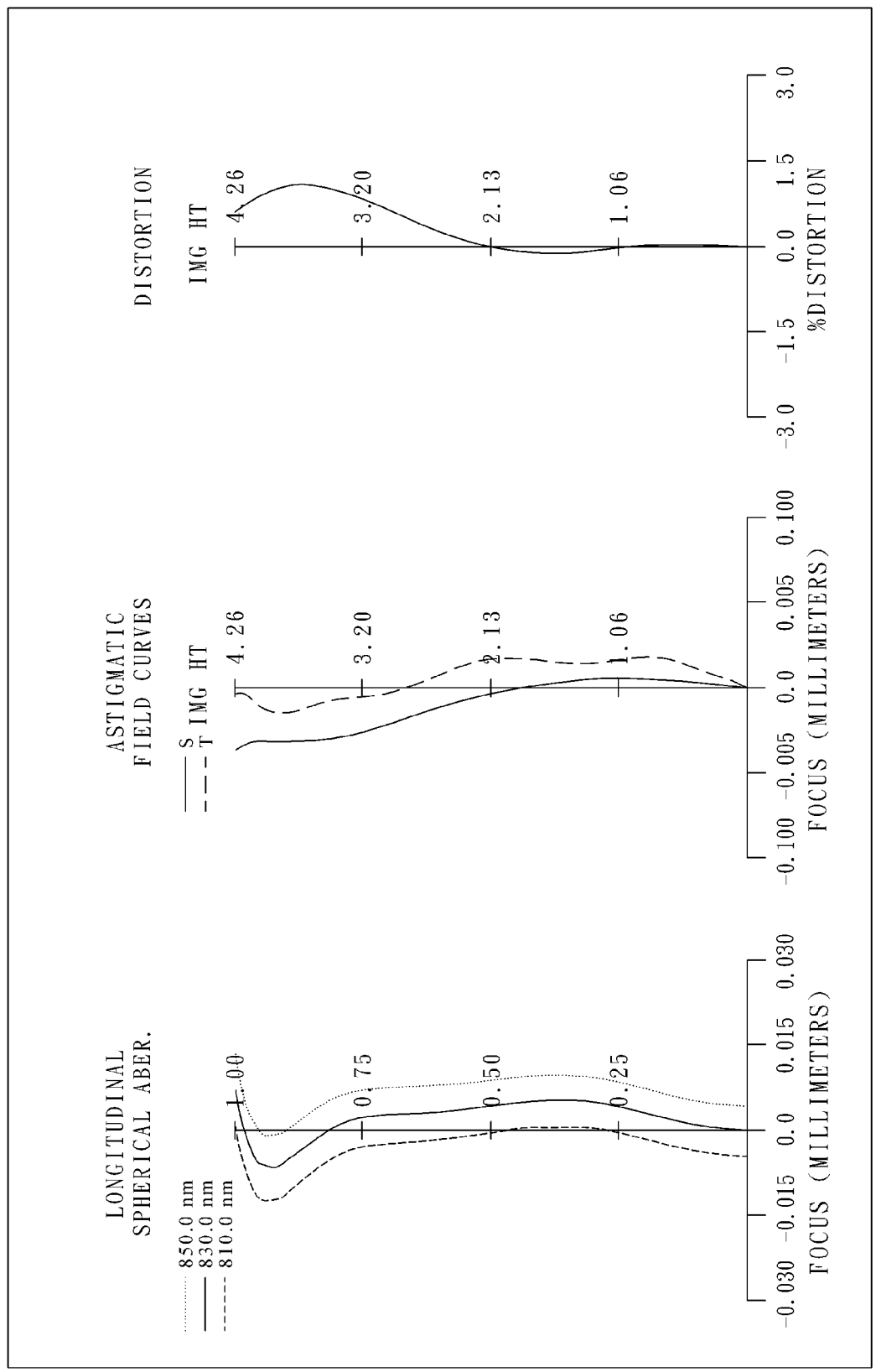
FIG. 1C shows the aberration curves of the first embodiment of the present invention.

FIG. 1A shows a photographing optical lens system in accordance with the first embodiment of the present invention, FIG. 1B shows the image-side surface characteristics of the fourth lens element of the first embodiment of the present invention, and FIG. 1C shows the aberration curves of the first embodiment of the present invention. The photographing optical lens system of the first embodiment of the present invention mainly comprises four lens elements with refractive power, in order from an object side to an image side:

a plastic first lens element 110 with negative refractive power having a convex object-side surface 111 at the paraxial region, a concave image-side surface 112 at the paraxial region, and both of the object-side surface 111 and image-side surface 112 thereof being aspheric;

a plastic second lens element 120 with positive refractive power having a concave object-side surface 121 at the paraxial region, a convex image-side surface 122 at the paraxial region, and both of the object-side surface 121 and image-side surface 122 thereof being aspheric;

a plastic third lens element 130 with positive refractive power having a concave object-side surface 131 at the paraxial region, a convex image-side surface 132 at the paraxial region, and both of the object-side surface 131 and image-side surface 132 thereof being aspheric, and a point projected onto the optical axis from a maximum effective diameter position on the image-side surface 132 of the third lens element 130 is closer to the object side than an axial vertex on the object-side surface 131 of the third lens element 130; and a plastic fourth lens element 140 with positive refractive power having a convex object-side surface 141 at the paraxial region, a concave image-side surface 142 at the paraxial region and a convex shape at peripheral region, and both of the object-side surface 141 and image-side surface 142 thereof being aspheric, and a distance in parallel with an optical axis from a point on the image-side surface 142 of the fourth lens element 140 to an axial vertex on the image-side surface 142 of the fourth lens element 140 is Sag42, a height perpendicular to the optical axis from the point on the image-side surface 142 of the fourth lens element 140 to the optical axis is Y, a second derivative of the distance Sag42 with respect to the height Y is DDsag42, and DDsag42 changes from positive to negative or vice versa at least once;

wherein the photographing optical lens system further comprises a stop 100 disposed between the first lens element 110 and the second lens element 120;

the photographing optical lens system further comprises a filter element 150 and a cover glass 160 sequentially disposed between the image-side surface 142 of the fourth lens element 140 and an image plane 170, and the filter element 150 and the cover glass 160 are made of glass and have no influence on the focal length of the photographing optical lens system.

The detailed optical data of the first embodiment is shown in TABLE 1, the aspheric surface data is shown in TABLE 2, and the image-side surface 142 characteristics of the fourth lens element 140 is shown in TABLE 3, wherein the units of the curvature radius, the thickness and the focal length are mm, and HFOV is half of the maximal field of view.

TABLE 1

(Embodiment 1)
f = 6.16 mm, Fno = 2.45, HFOV = 34.5 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 3.094 | (ASP) | 0.771 | Plastic | ARTON-D4532 | 1.507 | −32.21 |
| 2 | | 2.383 | (ASP) | 0.725 | | | | |
| 3 | Ape. Stop | Plano | | 0.093 | | | | |
| 4 | Lens 2 | −22.628 | (ASP) | 1.974 | Plastic | ARTON-D4532 | 1.507 | 6.27 |
| 5 | | −2.870 | (ASP) | 2.727 | | | | |
| 6 | Lens 3 | −1.411 | (ASP) | 1.240 | Plastic | PC | 1.569 | 175.77 |
| 7 | | −1.835 | (ASP) | 0.070 | | | | |
| 8 | Lens 4 | 3.516 | (ASP) | 2.641 | Plastic | ARTON-D4532 | 1.507 | 18.06 |
| 9 | | 4.265 | (ASP) | 1.000 | | | | |
| 10 | Filter | Plano | | 0.300 | Glass | HOYA BSC7 | 1.510 | — |
| 11 | | Plano | | 0.400 | | | | |
| 12 | cover glass | Plano | | 0.550 | Glass | HOYA BSC7 | 1.510 | — |
| 13 | | Plano | | 0.519 | | | | |
| 14 | Image | Plano | | — | | | | |

*The photographing optical lens system can be applied in an infrared wavelength range; the reference wavelength is 830 nm

TABLE 2

| Aspheric Coefficients | | | | |
|---|---|---|---|---|
| | Surface # | | | |
| | 1 | 2 | 4 | 5 |
| k = | 1.6936E+00 | 2.0000E+00 | −1.0000E+00 | −1.5861E−01 |
| A4 = | 5.9776E−03 | 9.9473E−03 | −9.6436E−03 | −8.2245E−03 |
| A6 = | 2.6249E−04 | −1.6104E−03 | 2.8125E−04 | −8.4139E−04 |
| A8 = | −8.3813E−05 | 1.7752E−03 | −2.5989E−03 | −6.3609E−04 |
| A10 = | 1.9885E−05 | −1.0102E−03 | 1.1686E−03 | 1.7852E−04 |
| A12 = | | | 2.4398E−05 | −4.4142E−05 |
| A14 = | | | | 1.1028E−06 |

TABLE 2-continued

Aspheric Coefficients

| | Surface # | | | |
|---|---|---|---|---|
| | 6 | 7 | 8 | 9 |
| k = | −2.0021E+00 | −7.9079E−01 | −2.2929E+00 | −1.4445E+01 |
| A4 = | −1.4180E−02 | 1.0803E−02 | −4.5073E−03 | −3.5199E−03 |
| A6 = | 3.1410E−03 | −8.3794E−05 | 6.6007E−04 | 5.2845E−04 |
| A8 = | −1.3319E−04 | 1.1362E−04 | −5.0503E−05 | −3.4483E−05 |
| A10 = | 1.0139E−06 | −4.9224E−08 | 2.0007E−06 | 8.3819E−07 |
| A12 = | | −6.6629E−07 | −3.5963E−08 | −8.3324E−09 |
| A14 = | | 3.3644E−08 | | |

TABLE 3

Embodiment 1: Characteristics of the image-side surface of Lens 4

| Y (mm) | Sag42 | Dsag42 | DDsag42 |
|---|---|---|---|
| 0.00 | 0.000 | 0.000 | 0.235 |
| 0.22 | 0.005 | 0.050 | 0.221 |
| 0.44 | 0.021 | 0.094 | 0.185 |
| 0.65 | 0.046 | 0.130 | 0.140 |
| 0.87 | 0.077 | 0.156 | 0.097 |
| 1.09 | 0.113 | 0.173 | 0.061 |
| 1.31 | 0.152 | 0.183 | 0.034 |
| 1.52 | 0.192 | 0.188 | 0.018 |
| 1.74 | 0.233 | 0.191 | 0.010 |
| 1.96 | 0.275 | 0.193 | 0.009 |
| 2.17 | 0.317 | 0.195 | 0.010 |
| 2.39 | 0.360 | 0.197 | 0.009 |
| 2.61 | 0.403 | 0.199 | 0.000 |
| 2.83 | 0.446 | 0.196 | −0.026 |
| 3.04 | 0.488 | 0.186 | −0.075 |
| 3.26 | 0.526 | 0.161 | −0.155 |
| 3.48 | 0.556 | 0.116 | −0.272 |
| 3.70 | 0.574 | 0.040 | −0.432 |
| 3.91 | 0.570 | −0.076 | −0.637 |
| 4.13 | 0.537 | −0.241 | −0.891 |
| 4.35 | 0.461 | −0.467 | −1.197 |

* The optical effective radius of the image-side surface of lens 4 is 4.35 mm

The equation of the aspheric surface profiles is expressed as follows:

$$X(Y) = (Y^2/R)/(1 + \sqrt{1 - (1+k)*(Y/R)^2}) + \sum_i (Ai)*(Y^i)$$

wherein:

X: the relative distance between a point on the aspheric surface at a distance Y from the optical axis and the tangential plane at the aspheric surface vertex;

Y: the distance from the point on the curve of the aspheric surface to the optical axis;

R: the curvature radius;

k: the conic coefficient;

Ai: the aspheric coefficient of order i.

In the first embodiment of the present photographing optical lens system, the focal length of the photographing optical lens system is f, and it satisfies the following relation: f=6.16 (mm).

In the first embodiment of the present photographing optical lens system, the f-number of the photographing optical lens system is Fno, and it satisfies the relation: Fno=2.45.

In the first embodiment of the present photographing optical lens system, half of the maximal field of view of the photographing optical lens system is HFOV, and it satisfies the relation: HFOV=34.5 deg.

In the first embodiment of the present photographing optical lens system, the refractive index of the first lens element 110 is N1, the refractive index of the second lens element 120 is N2, the refractive index of the third lens element 130 is N3, the refractive index of the fourth lens element 140 is N4, and they satisfy the relation: (N1*N2)/(N3*N4)=0.96.

In the first embodiment of the present photographing optical lens system, the central thickness of the third lens element 130 is CT3, the central thickness of the first lens element 110 is CT1, and they satisfy the relation: CT3/CT1=1.61.

In the first embodiment of the present photographing optical lens system, the axial distance between the first lens element 110 and the second lens element 120 is T12, the axial distance between the second lens element 120 and the third lens element 130 is T23, and they satisfy the relation: T12/T23=0.30.

In the first embodiment of the present photographing optical lens system, the curvature radius of the image-side surface 122 of the second lens element 120 is R4, the focal length of the photographing optical lens system is f, and they satisfy the relation: R4/f=−0.47.

In the first embodiment of the present photographing optical lens system, the curvature radius of the object-side surface 131 of the third lens element 130 is R5, the curvature radius of the image-side surface 132 of the third lens element 130 is R6, and they satisfy the relation: |(R5−R6)/(R5+R6)|=0.13.

In the first embodiment of the present photographing optical lens system, the focal length of the photographing optical lens system is f, the focal length of the third lens element 130 is f3, the focal length of the fourth lens element 140 is f4, and they satisfy the relation: |f/f3|+|f/f4|=0.38.

In the first embodiment of the present photographing optical lens system, the photographing optical lens system further comprises a stop 100, an axial distance between the stop 100 and the image-side surface 142 of the fourth lens element 140 is SD, with the direction toward the image-side side defined as positive or vice versa, an axial distance between the object-side surface 111 of the first lens element 110 and the image-side surface 142 of the fourth lens element 140 is TD, and they satisfy the relation: SD/TD=0.85.

Embodiment 2

Figure 2A:
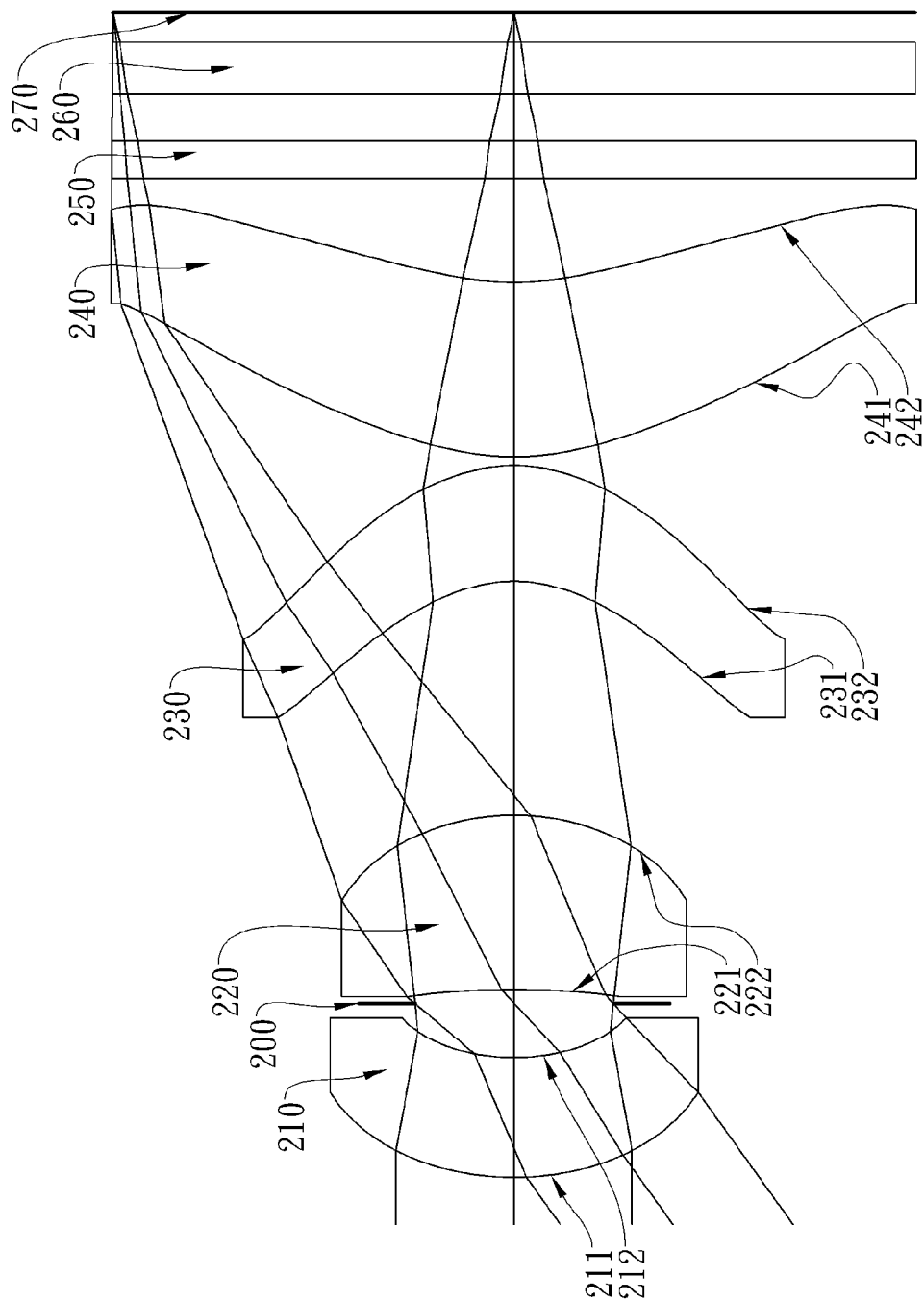
FIG. 2A shows a photographing optical lens system in accordance with the second embodiment of the present invention.
Figure 2B:
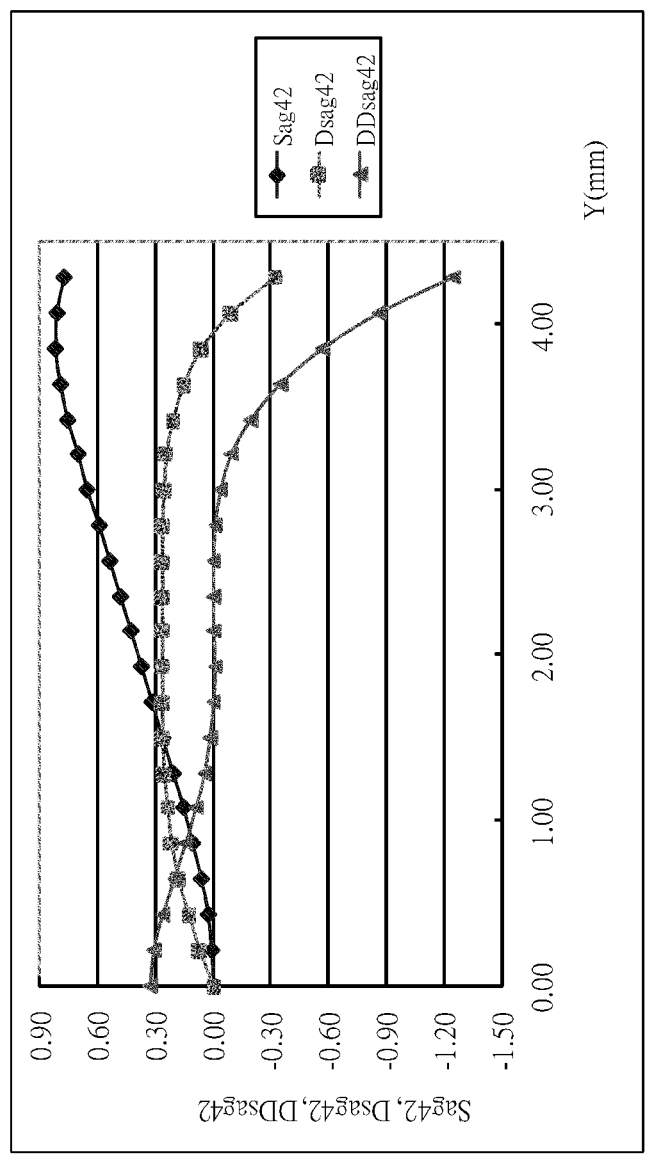
FIG. 2B shows the object-side surface characteristics of the third lens element of the second embodiment of the present invention.
Figure 2C:
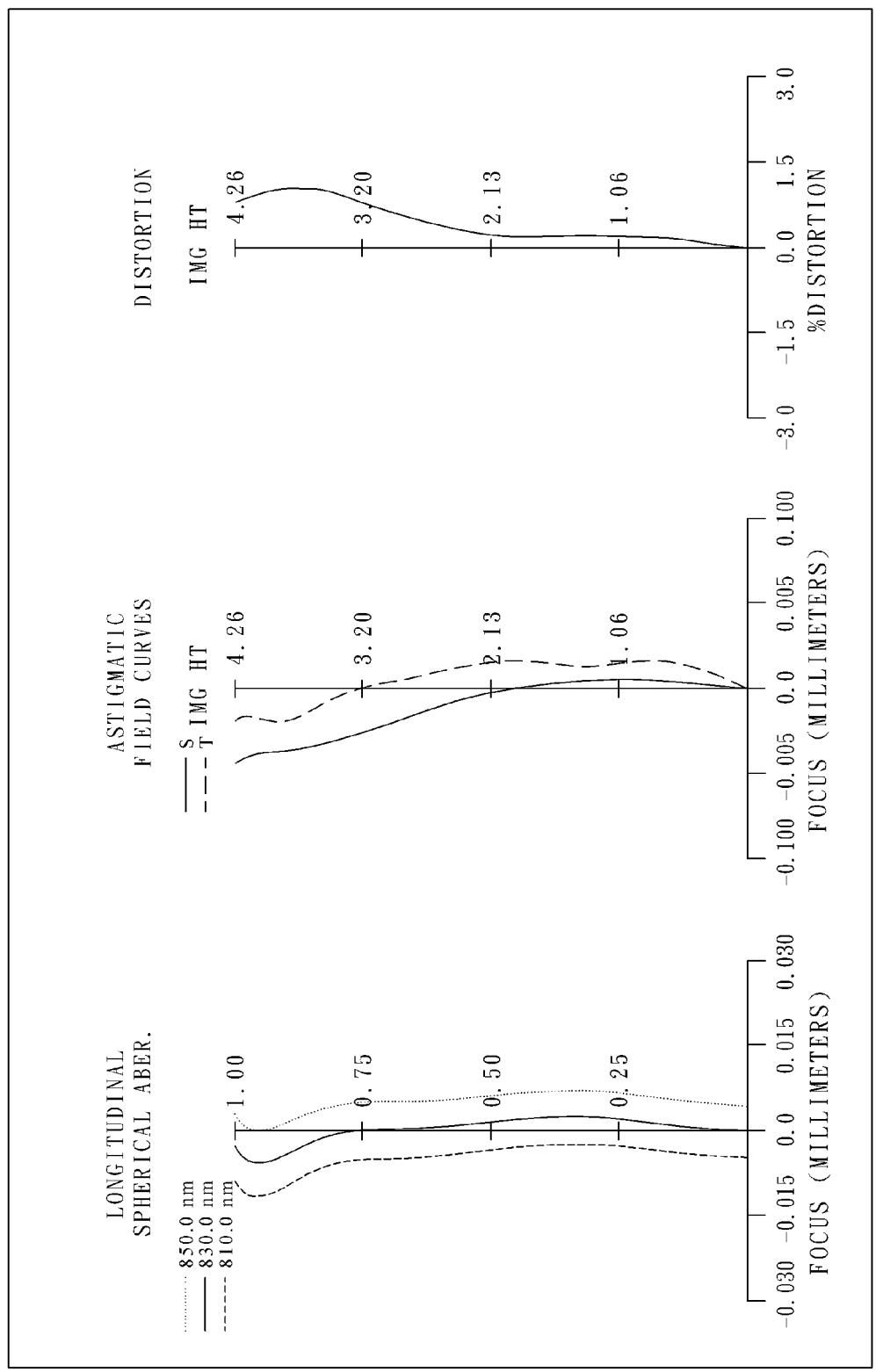
FIG. 2C shows the aberration curves of the second embodiment of the present invention.

FIG. 2A shows a photographing optical lens system in accordance with the second embodiment of the present invention, FIG. 2B shows the image-side surface characteristics of the fourth lens element of the second embodiment of the present invention, and FIG. 2C shows the aberration curves of the second embodiment of the present invention. The photographing optical lens system of the second embodiment of the present invention mainly comprises four lens elements with refractive power, in order from an object side to an image side:

a plastic first lens element 210 with negative refractive power having a convex object-side surface 211 at the paraxial region, a concave image-side surface 212 at the paraxial region, and both of the object-side surface 211 and image-side surface 212 thereof being aspheric;

a plastic second lens element 220 with positive refractive power having a concave object-side surface 221 at the paraxial region, a convex image-side surface 222 at the paraxial region, and both of the object-side surface 221 and image-side surface 222 thereof being aspheric;

a plastic third lens element 230 with positive refractive power having a concave object-side surface 231 at the paraxial region, a convex image-side surface 232 at the paraxial region, and both of the object-side surface 231 and image-side surface 232 thereof being aspheric, and a point projected onto the optical axis from a maximum effective diameter position on the image-side surface 232 of the third lens element 230 is closer to the object side than an axial vertex on the object-side surface 231 of the third lens element 230; and a plastic fourth lens element 240 with positive refractive power having a convex object-side surface 241 at the paraxial region, a concave image-side surface 242 at the paraxial region and a convex shape at peripheral region, and both of the object-side surface 241 and image-side surface 242 thereof being aspheric, and a distance in parallel with an optical axis from a point on the image-side surface 242 of the fourth lens element 240 to an axial vertex on the image-side surface 242 of the fourth lens element 240 is Sag42, a height perpendicular to the optical axis from the point on the image-side surface 242 of the fourth lens element 240 to the optical axis is Y, a second derivative of the distance Sag42 with respect to the height Y is DDsag42, and DDsag42 changes from positive to negative or vice versa at least thrice;

wherein the photographing optical lens system further comprises a stop 200 disposed between the first lens element 210 and the second lens element 220;

the photographing optical lens system further comprises a filter element 250 and a cover glass 260 sequentially disposed between the image-side surface 242 of the fourth lens element 240 and an image plane 270, and the filter element 250 and the cover glass 260 are made of glass and have no influence on the focal length of the photographing optical lens system.

The detailed optical data of the second embodiment is shown in TABLE 4, the aspheric surface data is shown in TABLE 5, and the image-side surface 242 characteristics of the fourth lens element 240 is shown in TABLE 6, wherein the units of the curvature radius, the thickness and the focal length are mm, and HFOV is half of the maximal field of view.

TABLE 4

(Embodiment 2)
f = 5.90 mm, Fno = 2.35, HFOV = 35.6 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 3.120 | (ASP) | 1.275 | Plastic | PC | 1.569 | −38.02 |
| 2 | | 2.322 | (ASP) | 0.575 | | | | |
| 3 | Ape. Stop | Plano | | 0.141 | | | | |
| 4 | Lens 2 | −12.678 | (ASP) | 1.858 | Plastic | ZEONEX F52R | 1.527 | 6.23 |
| 5 | | −2.742 | (ASP) | 2.496 | | | | |
| 6 | Lens 3 | −1.564 | (ASP) | 1.226 | Plastic | PC | 1.569 | 36.34 |
| 7 | | −1.868 | (ASP) | 0.100 | | | | |
| 8 | Lens 4 | 2.859 | (ASP) | 1.858 | Plastic | ZEONEX F52R | 1.527 | 19.15 |
| 9 | | 3.094 | (ASP) | 1.100 | | | | |
| 10 | Filter | Plano | | 0.400 | Glass | HOYA BSC7 | 1.510 | — |
| 11 | | Plano | | 0.500 | | | | |
| 12 | cover | Plano | | 0.550 | Glass | HOYA BSC7 | 1.510 | — |
| 13 | glass | Plano | | 0.321 | | | | |
| 14 | Image | Plano | | — | | | | |

* The photographing optical lens system can be applied in an infrared wavelength range; the reference wavelength is 830 nm

TABLE 5

Aspheric Coefficients

| | Surface # | | | |
|---|---|---|---|---|
| | 1 | 2 | 4 | 5 |
| k = | 1.1206E+00 | 2.0000E+00 | −1.0000E+00 | −1.5894E−01 |
| A4 = | 1.9897E−03 | 3.5966E−03 | −1.0643E−02 | −7.7825E−03 |
| A6 = | 1.1061E−04 | −1.4231E−03 | 1.0938E−03 | −1.0578E−03 |
| A8 = | −1.0833E−05 | 8.3252E−04 | −3.9065E−03 | −7.4867E−04 |
| A10 = | −9.4730E−07 | −1.0029E−03 | 1.9575E−03 | 1.8523E−04 |
| A12 = | | | 2.4398E−05 | −4.5318E−05 |
| A14 = | | | | −2.0714E−06 |

TABLE 5-continued

Aspheric Coefficients

| | Surface # | | | |
|---|---|---|---|---|
| | 6 | 7 | 8 | 9 |
| k = | −2.8411E+00 | −7.3518E−01 | −3.6625E+00 | −7.4422E+00 |
| A4 = | −2.1998E−02 | 8.7228E−03 | −3.0479E−03 | −5.0333E−03 |
| A6 = | 2.8241E−03 | −5.2893E−04 | 5.7858E−04 | 5.9741E−04 |
| A8 = | −1.0093E−04 | 1.1877E−04 | −4.4539E−05 | −3.0487E−05 |
| A10 = | 6.2616E−06 | 2.6924E−06 | 1.7293E−06 | 5.3052E−07 |
| A12 = | | −3.5296E−07 | −3.1491E−08 | −3.8045E−09 |
| A14 = | | 2.1544E−08 | | |

TABLE 6

Embodiment 2: Characteristics of the image-side surface of Lens 4

| Y (mm) | Sag42 | Dsag42 | DDsag42 |
|---|---|---|---|
| 0.00 | 0.000 | 0.000 | 0.323 |
| 0.21 | 0.007 | 0.068 | 0.306 |
| 0.43 | 0.029 | 0.129 | 0.261 |
| 0.64 | 0.062 | 0.179 | 0.202 |
| 0.86 | 0.104 | 0.215 | 0.142 |
| 1.07 | 0.153 | 0.240 | 0.089 |
| 1.29 | 0.206 | 0.254 | 0.047 |
| 1.50 | 0.262 | 0.261 | 0.018 |
| 1.71 | 0.318 | 0.263 | 0.000 |
| 1.93 | 0.374 | 0.262 | −0.007 |
| 2.14 | 0.430 | 0.261 | −0.006 |
| 2.36 | 0.486 | 0.260 | −0.001 |
| 2.57 | 0.541 | 0.260 | 0.001 |
| 2.78 | 0.597 | 0.260 | −0.007 |
| 3.00 | 0.652 | 0.255 | −0.035 |
| 3.21 | 0.706 | 0.242 | −0.094 |
| 3.43 | 0.755 | 0.212 | −0.194 |
| 3.64 | 0.795 | 0.155 | −0.349 |
| 3.86 | 0.818 | 0.058 | −0.569 |
| 4.07 | 0.816 | −0.094 | −0.864 |
| 4.28 | 0.773 | −0.318 | −1.245 |

* The optical effective radius of the image-side surface of lens 4 is 4.28 mm

The equation of the aspheric surface profiles of the second embodiment has the same form as that of the first embodiment. Moreover, the description of the factors in the relations is as those set forth in the first embodiment, but the values of the relations of the second embodiment are listed in the following TABLE 7.

TABLE 7

(Embodiment 2)

| f [mm] | 5.90 | T12/T23 | 0.29 |
|---|---|---|---|
| Fno | 2.35 | R4/f | −0.46 |
| HFOV [deg.] | 35.6 | |(R5 − R6)/(R5 + R6)| | 0.09 |
| (N1 * N2)/(N3 * N4) | 1.00 | |f/f3| + |f/f4| | 0.47 |
| CT3/CT1 | 0.96 | SD/TD | 0.81 |

Embodiment 3

Figure 3A:
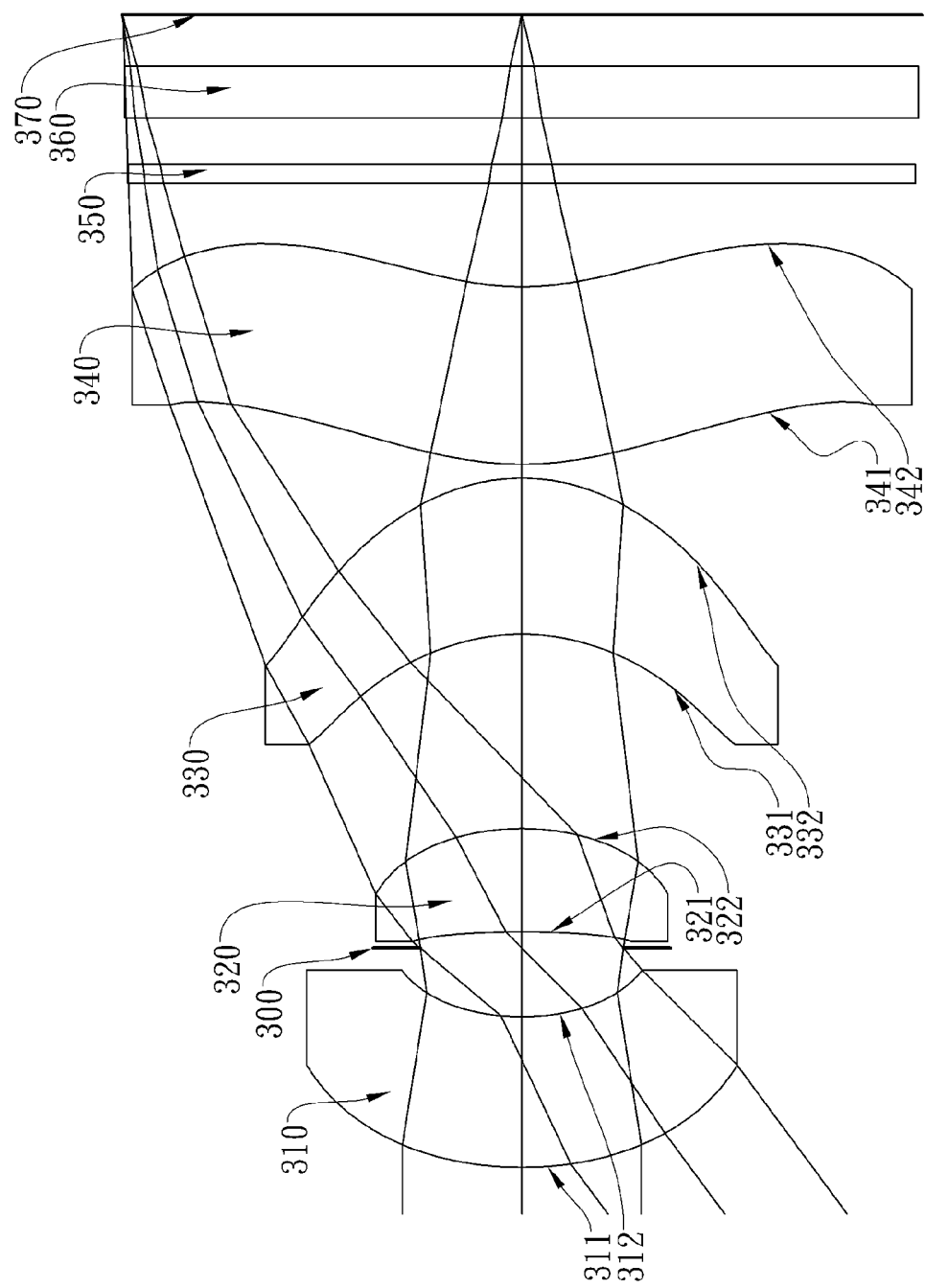
FIG. 3A shows a photographing optical lens system in accordance with the third embodiment of the present invention.
Figure 3B:
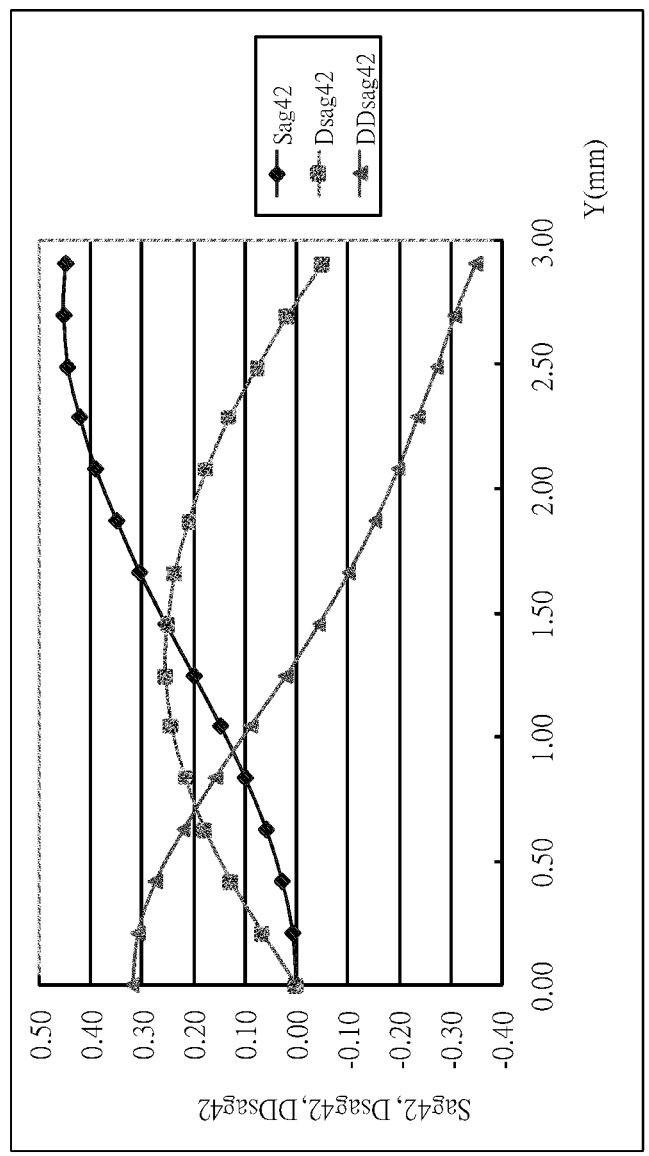
FIG. 3B shows the object-side surface characteristics of the third lens element of the third embodiment of the present invention.
Figure 3C:
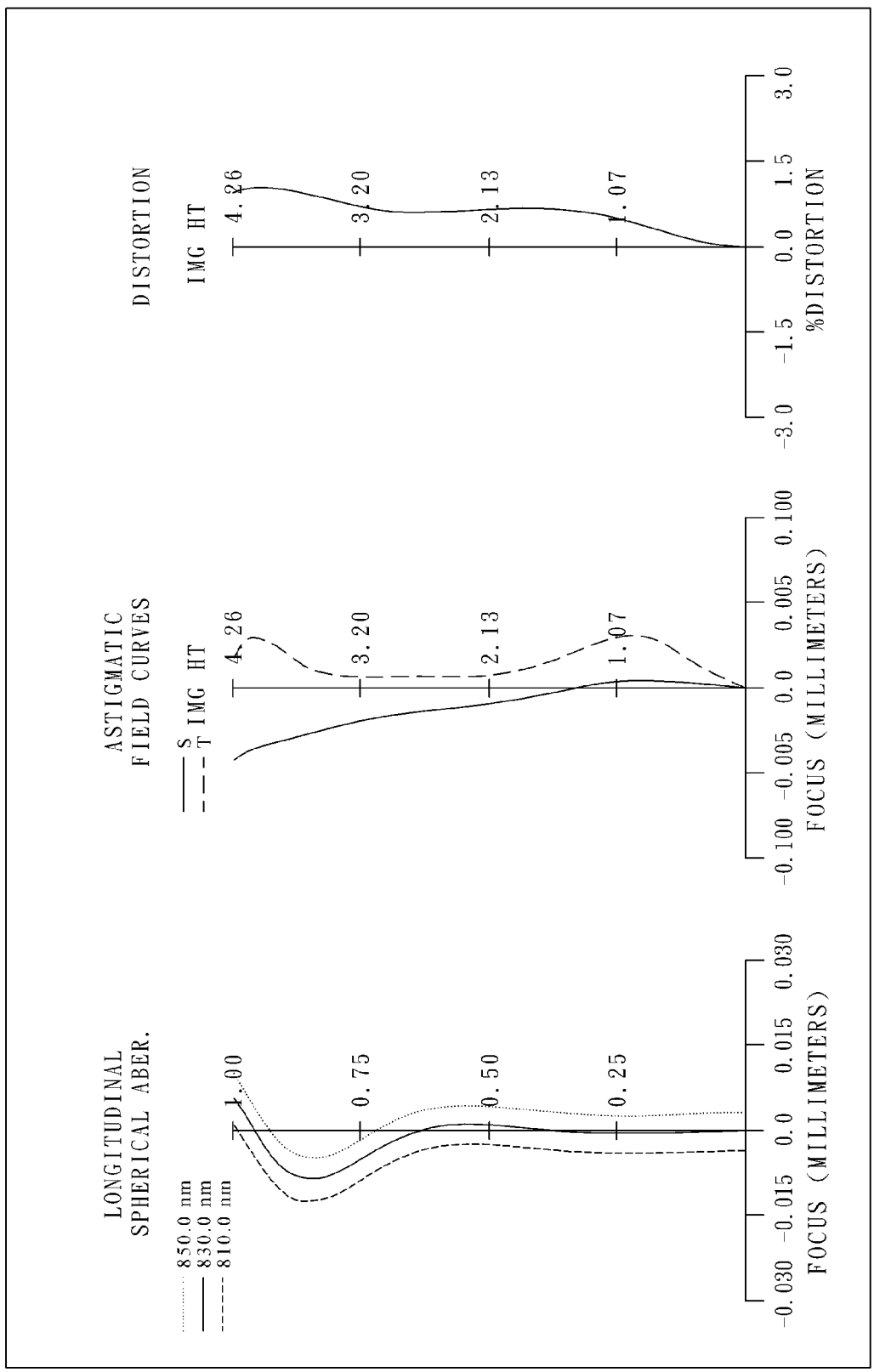
FIG. 3C shows the aberration curves of the third embodiment of the present invention.

FIG. 3A shows a photographing optical lens system in accordance with the third embodiment of the present invention, FIG. 3B shows the image-side surface characteristics of the fourth lens element of the third embodiment of the present invention, and FIG. 3C shows the aberration curves of the third embodiment of the present invention. The photographing optical lens system of the third embodiment of the present invention mainly comprises four lens elements with refractive power, in order from an object side to an image side:

a plastic first lens element 310 with negative refractive power having a convex object-side surface 311 at the paraxial region, a concave image-side surface 312 at the paraxial region, and both of the object-side surface 311 and image-side surface 312 thereof being aspheric;

a plastic second lens element 320 with positive refractive power having a concave object-side surface 321 at the paraxial region, a convex image-side surface 322 at the paraxial region, and both of the object-side surface 321 and image-side surface 322 thereof being aspheric;

a plastic third lens element 330 with positive refractive power having a concave object-side surface 331 at the paraxial region, a convex image-side surface 332 at the paraxial region, and both of the object-side surface 331 and image-side surface 332 thereof being aspheric, and a point projected onto the optical axis from a maximum effective diameter position on the image-side surface 332 of the third lens element 330 is closer to the object side than an axial vertex on the object-side surface 331 of the third lens element 330; and a plastic fourth lens element 340 with positive refractive power having a convex object-side surface 341 at the paraxial region, a concave image-side surface 342 at the paraxial region and a convex shape at peripheral region, and both of the object-side surface 341 and image-side surface 342 thereof being aspheric, and a distance in parallel with an optical axis from a point on the image-side surface 342 of the fourth lens element 340 to an axial vertex on the image-side surface 342 of the fourth lens element 340 is Sag42, a height perpendicular to the optical axis from the point on the image-side surface 342 of the fourth lens element 340 to the optical axis is Y, a second derivative of the distance Sag42 with respect to the height Y is DDsag42, and DDsag42 changes from positive to negative or vice versa at least once;

wherein the photographing optical lens system further comprises a stop 300 disposed between the first lens element 310 and the second lens element 320;

the photographing optical lens system further comprises a filter element 350 and a cover glass 360 sequentially disposed between the image-side surface 342 of the fourth lens element 340 and an image plane 370, and the filter element 350 and the cover glass 360 are made of glass and have no influence on the focal length of the photographing optical lens system.

The detailed optical data of the third embodiment is shown in TABLE 8, the aspheric surface data is shown in TABLE 9, and the image-side surface 342 characteristics of the fourth lens element 340 is shown in TABLE 10, wherein the units of the curvature radius, the thickness and the focal length are mm, and HFOV is half of the maximal field of view.

TABLE 8

(Embodiment3)
f = 5.72 mm, Fno = 2.25, HFOV = 36.4 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 3.702 | (ASP) | 1.607 | Plastic | MGC EP5000 | 1.616 | −23.45 |
| 2 | | 2.459 | (ASP) | 0.734 | | | | |
| 3 | Ape. Stop | Plano | | 0.172 | | | | |
| 4 | Lens 2 | −11.389 | (ASP) | 1.102 | Plastic | APEL-5514ML | 1.537 | 6.37 |
| 5 | | −2.721 | (ASP) | 2.075 | | | | |
| 6 | Lens 3 | −2.322 | (ASP) | 1.664 | Plastic | APEL-5514ML | 1.537 | 11.41 |
| 7 | | −2.105 | (ASP) | 0.150 | | | | |
| 8 | Lens 4 | 3.506 | (ASP) | 1.896 | Plastic | ZEONEX F52R | 1.527 | 78.99 |
| 9 | | 3.114 | (ASP) | 1.100 | | | | |
| 10 | Filter | Plano | | 0.200 | Glass | HOYA BSC7 | 1.510 | — |
| 11 | | Plano | | 0.500 | | | | |
| 12 | cover | Plano | | 0.550 | Glass | HOYA BSC7 | 1.510 | — |
| 13 | glass | Plano | | 0.551 | | | | |
| 14 | Image | Plano | | — | | | | |

* The photographing optical lens system can be applied in an infrared wavelength range; the reference wavelength is 830 nm

TABLE 9

Aspheric Coefficients

| | Surface # | | | |
|---|---|---|---|---|
| | 1 | 2 | 4 | 5 |
| k = | 1.0765E+00 | 2.0000E+00 | −9.7977E+00 | 1.5789E+00 |
| A4 = | 2.7340E−03 | 8.9114E−03 | −1.3004E−02 | −3.7831E−03 |
| A6 = | 1.4144E−04 | 7.4975E−04 | −7.5065E−03 | −2.2694E−03 |
| A8 = | −9.4234E−06 | −9.0235E−05 | 4.2515E−03 | 2.3080E−03 |
| A10 = | 4.9370E−06 | 4.5417E−04 | −3.2067E−03 | −2.4987E−03 |
| A12 = | | | 2.4398E−05 | 1.1474E−03 |
| A14 = | | | | −2.2007E−04 |

| | Surface # | | | |
|---|---|---|---|---|
| | 6 | 7 | 8 | 9 |
| k = | −4.3142E+00 | −5.8972E−01 | −3.5676E+00 | −4.4467E+00 |
| A4 = | −2.4007E−02 | 2.0913E−04 | −7.4927E−03 | −9.9173E−03 |
| A6 = | 1.7474E−03 | 1.2745E−04 | 6.7058E−04 | 6.4796E−04 |
| A8 = | −6.6976E−04 | 5.9380E−05 | −4.5376E−05 | −3.4992E−05 |
| A10 = | 1.1710E−04 | −2.1725E−05 | 1.9908E−06 | 1.2030E−06 |
| A12 = | | 1.4814E−06 | −5.3559E−08 | −2.4723E−08 |
| A14 = | | 2.1432E−07 | | |

TABLE 10

Embodiment 3: Characteristics of the image-side surface of Lens 4

| Y (mm) | Sag42 | Dsag42 | DDsag42 |
|---|---|---|---|
| 0.00 | 0.000 | 0.000 | 0.321 |
| 0.21 | 0.007 | 0.066 | 0.309 |
| 0.42 | 0.027 | 0.127 | 0.274 |
| 0.62 | 0.059 | 0.178 | 0.221 |
| 0.83 | 0.100 | 0.218 | 0.158 |
| 1.04 | 0.148 | 0.244 | 0.089 |
| 1.25 | 0.200 | 0.255 | 0.021 |
| 1.45 | 0.253 | 0.253 | −0.043 |
| 1.66 | 0.304 | 0.238 | −0.101 |
| 1.87 | 0.351 | 0.211 | −0.152 |
| 2.08 | 0.392 | 0.175 | −0.197 |
| 2.29 | 0.423 | 0.130 | −0.236 |
| 2.49 | 0.445 | 0.077 | −0.272 |
| 2.70 | 0.455 | 0.017 | −0.308 |
| 2.91 | 0.451 | −0.051 | −0.349 |
| 3.12 | 0.433 | −0.129 | −0.402 |
| 3.32 | 0.397 | −0.220 | −0.479 |
| 3.53 | 0.340 | −0.331 | −0.602 |
| 3.74 | 0.257 | −0.475 | −0.804 |
| 3.95 | 0.139 | −0.674 | −1.142 |
| 4.15 | −0.029 | −0.965 | −1.711 |

* The optical effective radius of the image-side surface of lens 4 is 4.15 mm

The equation of the aspheric surface profiles of the third embodiment has the same form as that of the first embodiment. Moreover, the description of the factors in the relations is as those set forth in the first embodiment, but the values of the relations of the third embodiment are listed in the following TABLE 11.

TABLE 11

(Embodiment 3)

| f [mm] | 5.72 | T12/T23 | 0.44 |
|---|---|---|---|
| Fno | 2.25 | R4/f | −0.48 |
| HFOV [deg.] | 36.4 | \|(R5 − R6)/(R5 + R6)\| | 0.05 |
| (N1 * N2)/(N3 * N4) | 1.06 | \|f/f3\| + \|f/f4\| | 0.57 |
| CT3/CT1 | 1.04 | SD/TD | 0.75 |

Embodiment 4

Figure 4A:
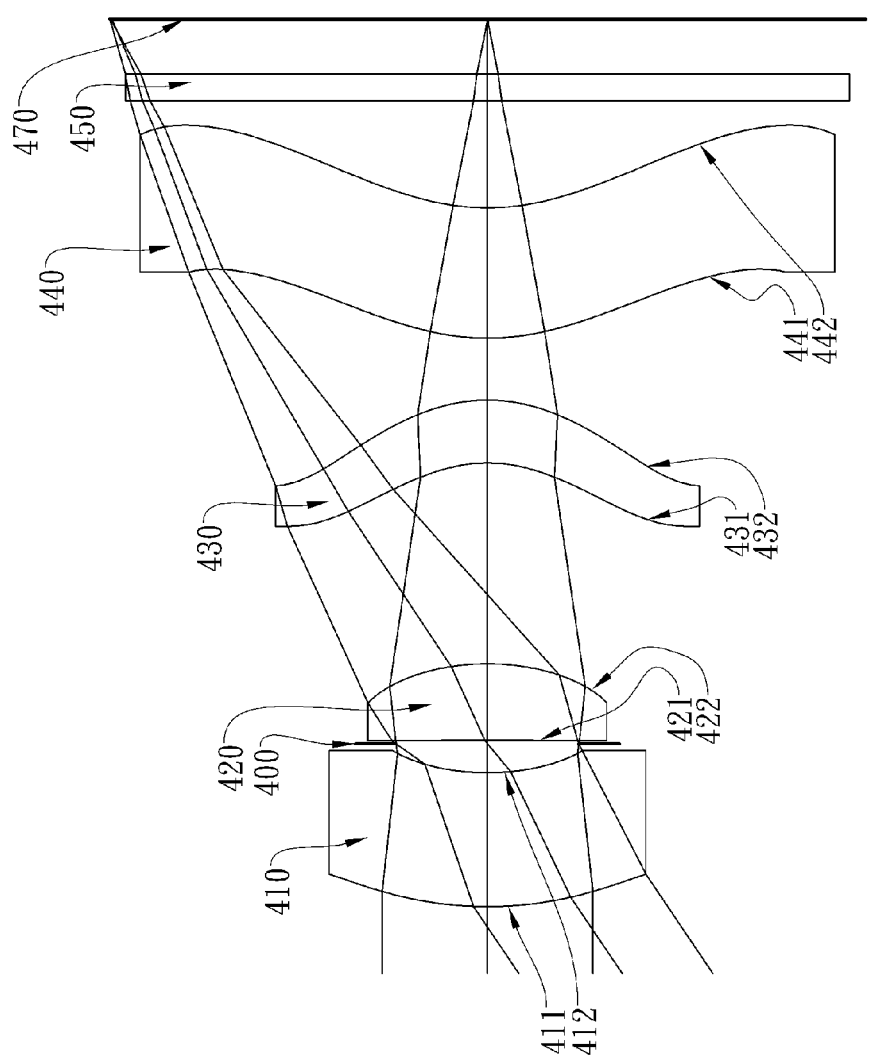
FIG. 4A shows a photographing optical lens system in accordance with the fourth embodiment of the present invention.
Figure 4B:
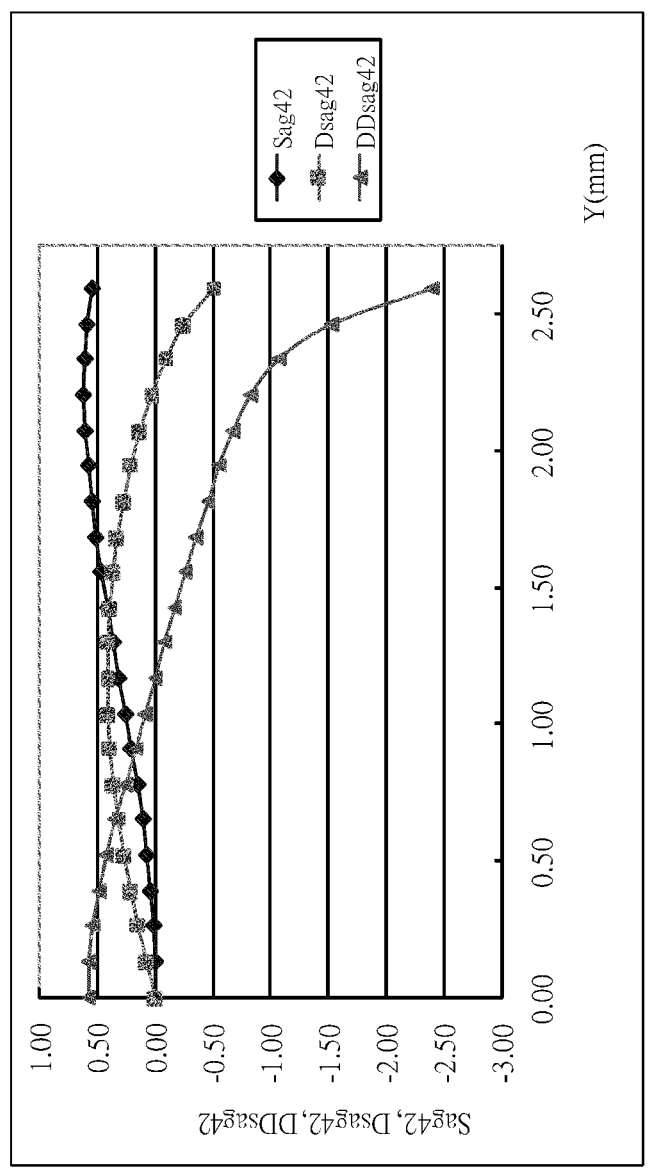
FIG. 4B shows the object-side surface characteristics of the third lens element of the fourth embodiment of the present invention.
Figure 4C:
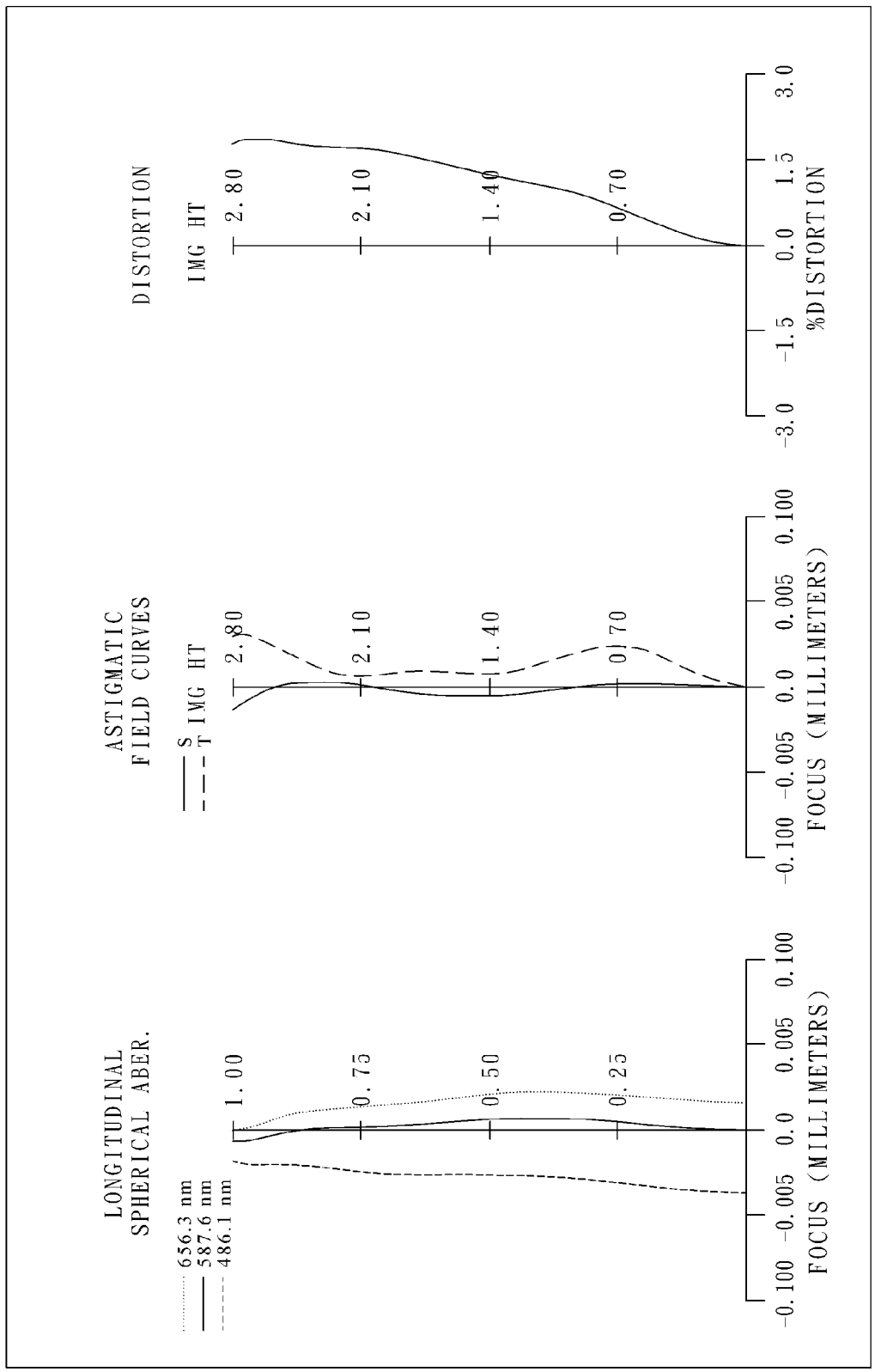
FIG. 4C shows the aberration curves of the fourth embodiment of the present invention.

FIG. 4A shows a photographing optical lens system in accordance with the fourth embodiment of the present invention, FIG. 4B shows the image-side surface characteristics of the fourth lens element of the fourth embodiment of the present invention, and FIG. 4C shows the aberration curves of the fourth embodiment of the present invention. The photographing optical lens system of the fourth embodiment of the present invention mainly comprises four lens elements with refractive power, in order from an object side to an image side:

a plastic first lens element 410 with negative refractive power having a convex object-side surface 411 at the paraxial region, a concave image-side surface 412 at the paraxial region, and both of the object-side surface 411 and image-side surface 412 thereof being aspheric;

a plastic second lens element 420 with positive refractive power having a concave object-side surface 421 at the paraxial region, a convex image-side surface 422 at the paraxial region, and both of the object-side surface 421 and image-side surface 422 thereof being aspheric;

a plastic third lens element 430 with positive refractive power having a concave object-side surface 431 at the paraxial region, a convex image-side surface 432 at the paraxial region, and both of the object-side surface 431 and image-side surface 432 thereof being aspheric, and a point projected onto the optical axis from a maximum effective diameter position on the image-side surface 432 of the third lens element 430 is closer to the object side than an axial vertex on the object-side surface 431 of the third lens element 430; and a plastic fourth lens element 440 with positive refractive power having a convex object-side surface 441 at the paraxial region, a concave image-side surface 442 at the paraxial region and a convex shape at peripheral region, and both of the object-side surface 441 and image-side surface 442 thereof being aspheric, and a distance in parallel with an optical axis from a point on the image-side surface 442 of the fourth lens element 440 to an axial vertex on the image-side surface 442 of the fourth lens element 440 is Sag42, a height perpendicular to the optical axis from the point on the image-side surface 442 of the fourth lens element 440 to the optical axis is Y, a second derivative of the distance Sag42 with respect to the height Y is DDsag42, and DDsag42 changes from positive to negative or vice versa at least once;

wherein the photographing optical lens system further comprises a stop 400 disposed between the first lens element 410 and the second lens element 420;

the photographing optical lens system further comprises a filter element 450 disposed between the image-side surface 442 of the fourth lens element 440 and an image plane 470, and the filter element 450 is made of glass and have no influence on the focal length of the photographing optical lens system.

The detailed optical data of the fourth embodiment is shown in TABLE 12, the aspheric surface data is shown in TABLE 13, and the image-side surface 442 characteristics of the fourth lens element 440 is shown in TABLE 14, wherein the units of the curvature radius, the thickness and the focal length are mm, and HFOV is half of the maximal field of view.

TABLE 12

(Embodiment 4)

f = 4.09 mm, Fno = 2.60, HFOV = 33.9 deg.

| Surface # | | Curvature Radius | | Thickness | Material | Refractive Index | Focal Length |
|---|---|---|---|---|---|---|---|
| 0 | Object | Plano | | Infinity | | | |
| 1 | Lens 1 | 2.718 | (ASP) | 1.000 | Plastic | TEIJIN SP3810 | 1.640 | −15.75 |
| 2 | | 1.833 | (ASP) | 0.216 | | | |
| 3 | Ape. Stop | Plano | | 0.025 | | | |
| 4 | Lens 2 | −66.979 | (ASP) | 0.571 | Plastic | APEL-5514ML | 1.544 | 3.43 |
| 5 | | −1.821 | (ASP) | 1.500 | | | |
| 6 | Lens 3 | −1.092 | (ASP) | 0.469 | Plastic | APEL-5514ML | 1.544 | 61.71 |
| 7 | | −1.217 | (ASP) | 0.462 | | | |
| 8 | Lens 4 | 1.757 | (ASP) | 0.972 | Plastic | ZEONEX F52R | 1.535 | 19.43 |
| 9 | | 1.707 | (ASP) | 0.800 | | | |
| 10 | Filter | Plano | | 0.200 | Glass | HOYA BSC7 | 1.517 | — |
| 11 | | Plano | | 0.410 | | | |
| 12 | Image | Plano | | — | | | |

* The reference wavelength is d-line 587.6 nm

TABLE 13

Aspheric Coefficients

| | Surface # | | | |
|---|---|---|---|---|
| | 1 | 2 | 4 | 5 |
| k = | 1.9495E−01 | 1.0216E+00 | −1.0000E+00 | −4.0506E−01 |
| A4 = | −3.6590E−03 | 3.3208E−02 | −9.8476E−03 | −3.3503E−02 |
| A6 = | −4.1745E−03 | 7.8246E−02 | 5.9174E−02 | −7.6999E−02 |
| A8 = | −7.4289E−04 | −1.7608E−01 | −2.2903E−01 | 1.0927E−01 |
| A10 = | −8.6380E−04 | 2.5476E−01 | 3.4185E−01 | −1.5556E−01 |
| A12 = | −1.5577E−03 | 4.3811E−02 | −1.5051E−01 | 7.4763E−04 |
| A14 = | 1.1184E−03 | −1.8918E−02 | | |
| A16 = | −3.6186E−04 | 1.9773E−03 | | |

| | Surface # | | | |
|---|---|---|---|---|
| | 6 | 7 | 8 | 9 |
| k = | −2.3126E+00 | −1.2541E+00 | −3.2785E+00 | −1.0966E+00 |
| A4 = | 1.0670E−02 | 1.3982E−02 | −1.0770E−02 | −5.4421E−02 |
| A6 = | 1.5676E−02 | 4.3625E−03 | −1.9279E−03 | 9.4503E−03 |
| A8 = | 4.3339E−03 | 2.9945E−03 | 2.4245E−04 | −1.4998E−03 |
| A10 = | −2.8494E−04 | 9.0386E−04 | −2.5863E−05 | 9.4142E−05 |
| A12 = | −6.0121E−04 | 2.3992E−05 | 2.0241E−06 | 8.8558E−06 |
| A14 = | −6.0705E−05 | −4.7173E−05 | 1.2519E−06 | −1.6597E−06 |
| A16 = | 2.0616E−05 | −2.8864E−05 | −2.5295E−07 | 5.8987E−08 |

TABLE 14

Embodiment 4: Characteristics of the image-side surface of Lens 4

| Y (mm) | Sag42 | Dsag42 | DDsag42 |
|---|---|---|---|
| 0.00 | 0.000 | 0.000 | 0.586 |
| 0.13 | 0.005 | 0.075 | 0.574 |
| 0.26 | 0.019 | 0.148 | 0.541 |
| 0.39 | 0.043 | 0.215 | 0.489 |
| 0.52 | 0.075 | 0.274 | 0.422 |
| 0.65 | 0.114 | 0.324 | 0.344 |
| 0.78 | 0.158 | 0.363 | 0.260 |
| 0.91 | 0.207 | 0.391 | 0.175 |
| 1.04 | 0.259 | 0.408 | 0.090 |
| 1.17 | 0.312 | 0.414 | 0.006 |
| 1.30 | 0.366 | 0.410 | −0.078 |
| 1.43 | 0.418 | 0.394 | −0.164 |
| 1.56 | 0.467 | 0.367 | −0.254 |
| 1.68 | 0.513 | 0.328 | −0.350 |
| 1.81 | 0.552 | 0.276 | −0.450 |
| 1.94 | 0.584 | 0.211 | −0.556 |
| 2.07 | 0.606 | 0.132 | −0.673 |
| 2.20 | 0.617 | 0.035 | −0.825 |
| 2.33 | 0.614 | −0.086 | −1.070 |
| 2.46 | 0.593 | −0.251 | −1.524 |
| 2.59 | 0.545 | −0.499 | −2.390 |

* The optical effective radius of the image-side surface of lens 4 is 2.59 mm

The equation of the aspheric surface profiles of the fourth embodiment has the same form as that of the first embodiment. Moreover, the description of the factors in the relations is as those set forth in the first embodiment, but the values of the relations of the fourth embodiment are listed in the following TABLE 15.

TABLE 15

(Embodiment 4)

| f [mm] | 4.09 | T12/T23 | 0.16 |
|---|---|---|---|
| Fno | 2.60 | R4/f | −0.45 |
| HFOV [deg.] | 33.9 | |(R5 − R6)/(R5 + R6)| | 0.05 |
| (N1 * N2)/(N3 * N4) | 1.07 | |f/f3| + |f/f4| | 0.28 |
| CT3/CT1 | 0.47 | SD/TD | 0.77 |

Embodiment 5

Figure 5A:
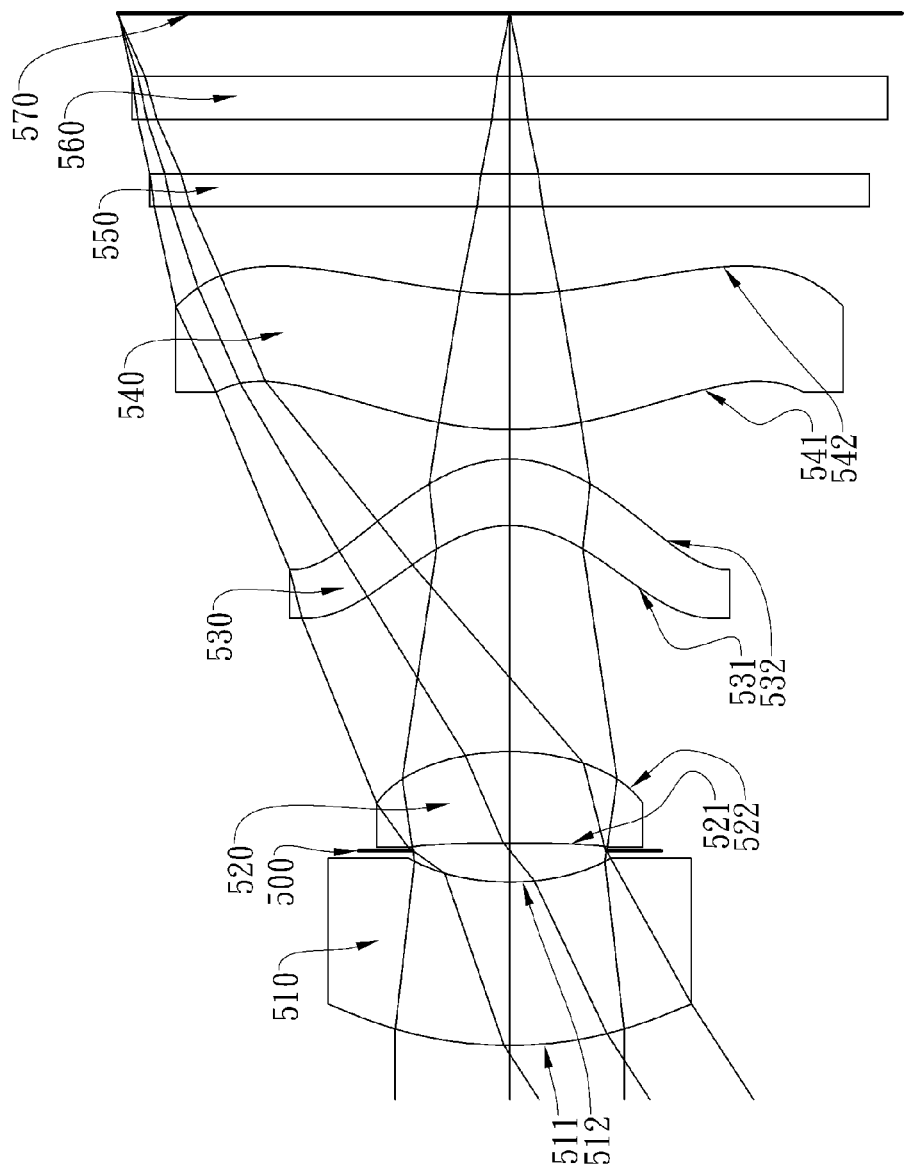
FIG. 5A shows a photographing optical lens system in accordance with the fifth embodiment of the present invention.
Figure 5B:
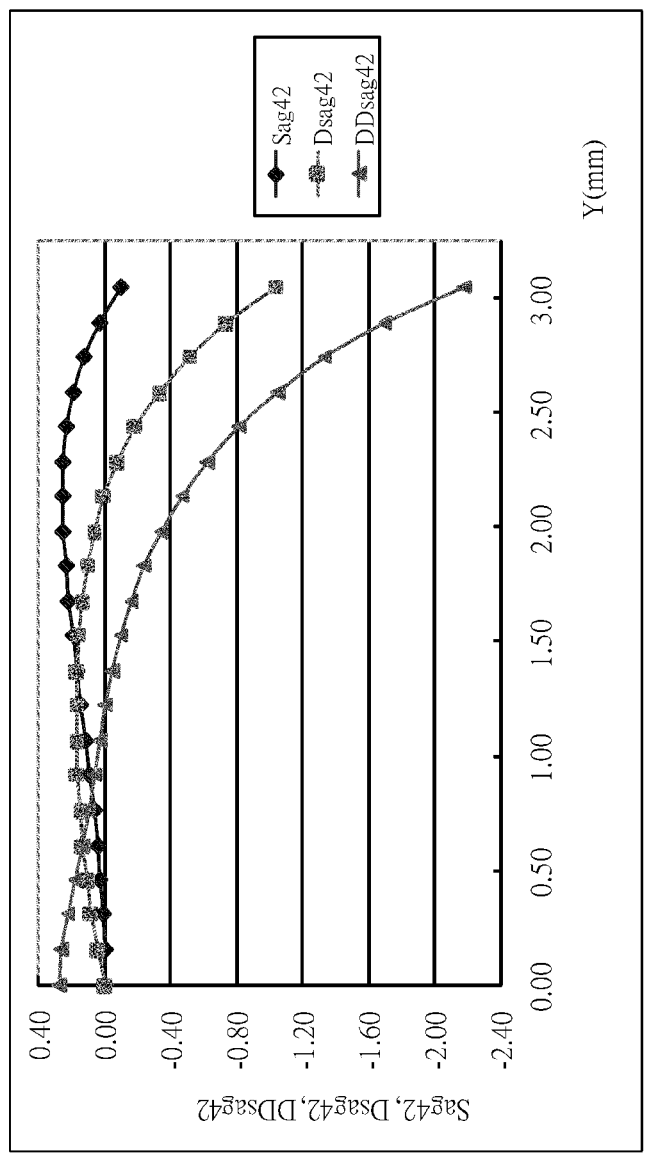
FIG. 5B shows the object-side surface characteristics of the third lens element of the fifth embodiment of the present invention.
Figure 5C:
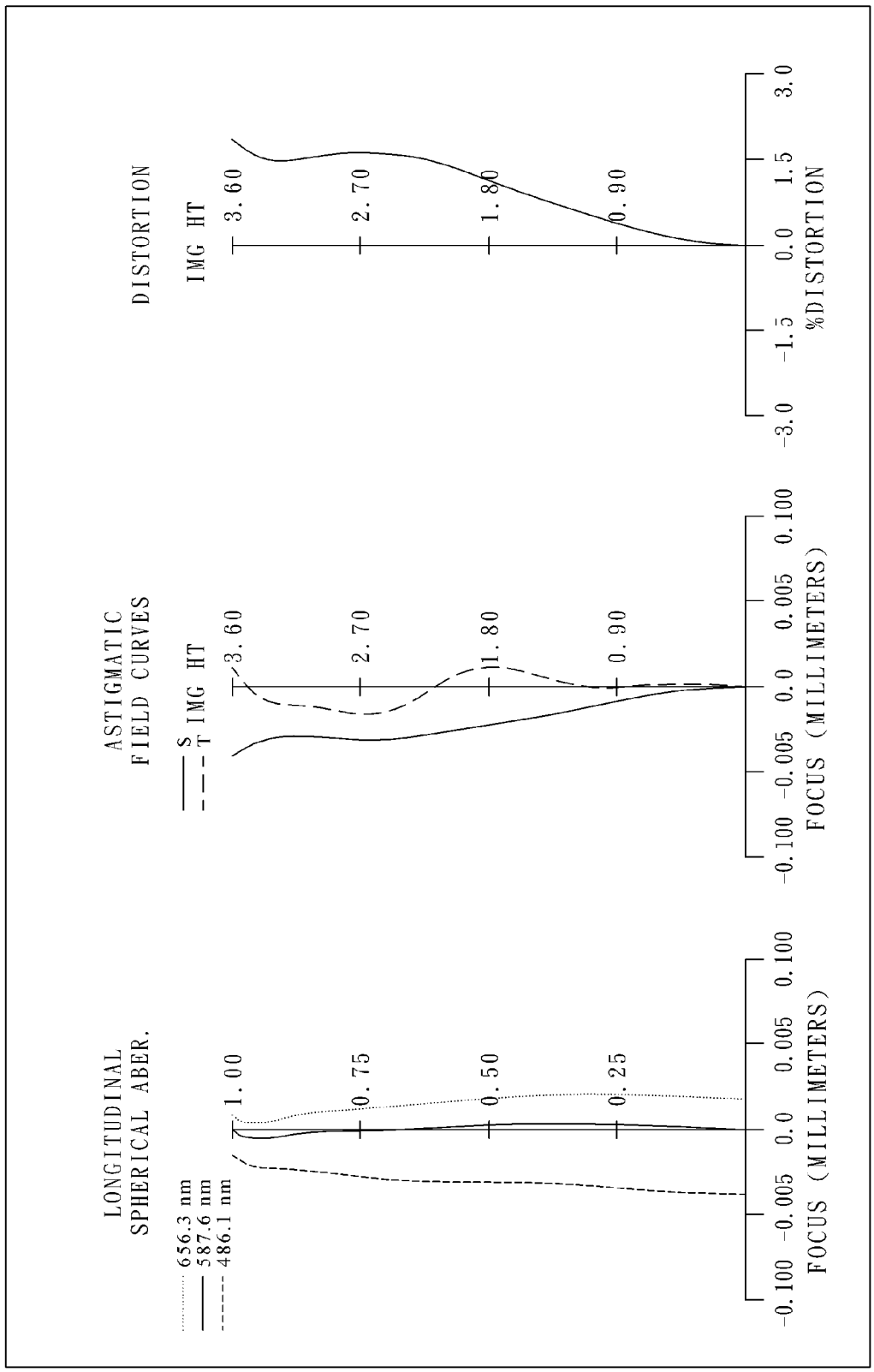
FIG. 5C shows the aberration curves of the fifth embodiment of the present invention.

FIG. 5A shows a photographing optical lens system in accordance with the fifth embodiment of the present invention, FIG. 5B shows the image-side surface characteristics of the fourth lens element of the fifth embodiment of the present invention, and FIG. 5C shows the aberration curves of the fifth embodiment of the present invention. The photographing optical lens system of the fifth embodiment of the present invention mainly comprises four lens elements with refractive power, in order from an object side to an image side:

a plastic first lens element 510 with negative refractive power having a convex object-side surface 511 at the paraxial region, a concave image-side surface 512 at the paraxial region, and both of the object-side surface 511 and image-side surface 512 thereof being aspheric;

a plastic second lens element 520 with positive refractive power having a concave object-side surface 521 at the paraxial region, a convex image-side surface 522 at the paraxial region, and both of the object-side surface 521 and image-side surface 522 thereof being aspheric;

a plastic third lens element 530 with positive refractive power having a concave object-side surface 531 at the paraxial region, a convex image-side surface 532 at the paraxial region, and both of the object-side surface 531 and image-side surface 532 thereof being aspheric, and a point projected onto the optical axis from a maximum effective diameter position on the image-side surface 532 of the third lens element 530 is closer to the object side than an axial vertex on the object-side surface 531 of the third lens element 530; and a plastic fourth lens element 540 with positive refractive power having a convex object-side surface 541 at the paraxial region, a concave image-side surface 542 at the paraxial region and a convex shape at peripheral region, and both of the object-side surface 541 and image-side surface 542 thereof being aspheric, and a distance in parallel with an optical axis from a point on the image-side surface 542 of the fourth lens element 540 to an axial vertex on the image-side surface 542 of the fourth lens element 540 is Sag42, a height perpendicular to the optical axis from the point on the image-side surface 542 of the fourth lens element 540 to the optical axis is Y, a second derivative of the distance Sag42 with respect to the height Y is DDsag42, and DDsag42 changes from positive to negative or vice versa at least once;

wherein the photographing optical lens system further comprises a stop 500 disposed between the first lens element 510 and the second lens element 520;

the photographing optical lens system further comprises a filter element 550 and a cover glass 560 sequentially disposed between the image-side surface 542 of the fourth lens element 540 and an image plane 570, and the filter element 550 and the cover glass 560 are made of glass and have no influence on the focal length of the photographing optical lens system.

The detailed optical data of the fifth embodiment is shown in TABLE 16, the aspheric surface data is shown in TABLE 17, and the image-side surface 542 characteristics of the fourth lens element 540 is shown in TABLE 18, wherein the units of the curvature radius, the thickness and the focal length are mm, and HFOV is half of the maximal field of view.

TABLE 16

(Embodiment 5)
f = 5.45 mm, Fno = 2.60, HFOV = 32.9 deg.

| Surface # | | Curvature Radius | | Thickness | Material | Refractive Index | Focal Length |
|---|---|---|---|---|---|---|---|
| 0 | Object | Plano | | Infinity | | | |
| 1 | Lens 1 | 3.740 | (ASP) | 1.500 | Plastic | TEIJIN SP3810 | 1.640 | −17.50 |
| 2 | | 2.365 | (ASP) | 0.288 | | | | |
| 3 | Ape. Stop | Plano | | 0.070 | | | | |
| 4 | Lens 2 | −21.645 | (ASP) | 0.839 | Plastic | SUMITA | 1.592 | 4.34 |
| 5 | | −2.330 | (ASP) | 2.078 | | KGFK68 | | |
| 6 | Lens 3 | −0.968 | (ASP) | 0.611 | Plastic | ZEONEX F52R | 1.535 | 41.87 |
| 7 | | −1.132 | (ASP) | 0.269 | | | | |
| 8 | Lens 4 | 3.030 | (ASP) | 1.245 | Plastic | ZEONEX F52R | 1.535 | 20.19 |
| 9 | | 3.610 | (ASP) | 0.800 | | | | |
| 10 | Filter | Plano | | 0.300 | Glass | HOYA BSC7 | 1.517 | — |
| 11 | | Plano | | 0.500 | | | | |
| 12 | cover | Plano | | 0.400 | Glass | HOYA BSC7 | 1.517 | — |
| 13 | glass | Plano | | 0.579 | | | | |
| 14 | Image | Plano | | — | | | | |

\* The reference wavelength is d-line 587.6 nm

TABLE 17

Aspheric Coefficients

| | Surface # | | | |
|---|---|---|---|---|
| | 1 | 2 | 4 | 5 |
| k = | −6.1001E−02 | 3.7088E+00 | −2.0000E+01 | 2.1652E+00 |
| A4 = | 1.6242E−03 | −4.2345E−03 | −1.6720E−02 | −7.5863E−04 |
| A6 = | −1.0090E−03 | −2.4286E−02 | −5.8257E−03 | 5.7607E−03 |
| A8 = | 4.5866E−04 | 2.3661E−02 | −3.0944E−03 | −1.1952E−02 |
| A10 = | −2.1776E−04 | −2.7356E−02 | −3.7279E−03 | 1.1699E−02 |
| A12 = | 1.8260E−05 | −3.6210E−13 | 1.4579E−07 | −5.3793E−03 |
| A14 = | | | | 6.3367E−04 |

| | Surface # | | | |
|---|---|---|---|---|
| | 6 | 7 | 8 | 9 |
| k = | −1.5487E+00 | −1.2257E+00 | −1.1059E+00 | −2.0000E+01 |
| A4 = | 1.2567E−02 | 1.5859E−02 | −1.8382E−02 | −1.4755E−03 |
| A6 = | 8.2770E−03 | 1.1158E−03 | 1.6514E−03 | −1.8001E−04 |
| A8 = | 1.1405E−03 | 5.5976E−04 | −1.9232E−04 | −1.1009E−04 |
| A10 = | −4.8277E−04 | 1.1984E−04 | −5.9545E−07 | 9.9455E−06 |
| A12 = | 1.9188E−05 | 1.0936E−05 | 3.5914E−07 | −3.5908E−07 |
| A14 = | | −7.3626E−06 | | |

TABLE 18

Embodiment 5: Characteristics of the image-side surface of Lens 4

| Y (mm) | Sag42 | Dsag42 | DDsag42 |
|---|---|---|---|
| 0.00 | 0.000 | 0.000 | 0.277 |
| 0.15 | 0.003 | 0.042 | 0.263 |
| 0.31 | 0.012 | 0.079 | 0.227 |
| 0.46 | 0.027 | 0.110 | 0.182 |
| 0.61 | 0.046 | 0.135 | 0.137 |
| 0.76 | 0.068 | 0.152 | 0.097 |
| 0.91 | 0.092 | 0.164 | 0.062 |
| 1.07 | 0.117 | 0.171 | 0.029 |
| 1.22 | 0.144 | 0.173 | −0.005 |
| 1.37 | 0.170 | 0.170 | −0.045 |
| 1.52 | 0.195 | 0.159 | −0.094 |
| 1.68 | 0.218 | 0.140 | −0.157 |
| 1.83 | 0.237 | 0.110 | −0.238 |
| 1.98 | 0.251 | 0.066 | −0.341 |
| 2.13 | 0.256 | 0.005 | −0.469 |
| 2.29 | 0.251 | −0.078 | −0.625 |
| 2.44 | 0.231 | −0.187 | −0.815 |
| 2.59 | 0.193 | −0.328 | −1.046 |
| 2.74 | 0.129 | −0.509 | −1.331 |
| 2.90 | 0.035 | −0.738 | −1.694 |
| 3.05 | −0.099 | −1.031 | −2.178 |

* The optical effective radius of the image-side surface of lens 4 is 3.05 mm

The equation of the aspheric surface profiles of the fifth embodiment has the same form as that of the first embodiment. Moreover, the description of the factors in the relations is as those set forth in the first embodiment, but the values of the relations of the fifth embodiment are listed in the following TABLE 19.

TABLE 19

(Embodiment 5)

| | | | |
|---|---|---|---|
| f [mm] | 5.45 | T12/T23 | 0.17 |
| Fno | 2.60 | R4/f | −0.43 |
| HFOV [deg.] | 32.9 | |(R5 − R6)/(R5 + R6)| | 0.08 |
| (N1 * N2)/(N3 * N4) | 1.11 | |f/f3| + |f/f4| | 0.40 |
| CT3/CT1 | 0.41 | SD/TD | 0.74 |

Embodiment 6

Figure 6B:
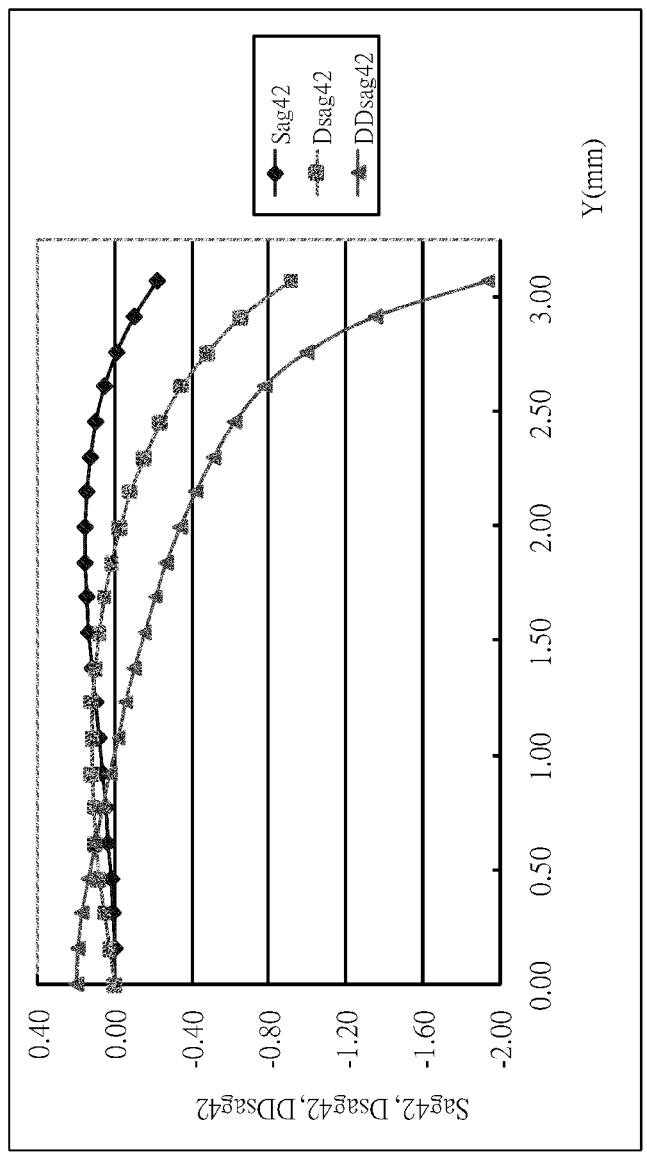
FIG. 6B shows the object-side surface characteristics of the third lens element of the sixth embodiment of the present invention.
Figure 6C:
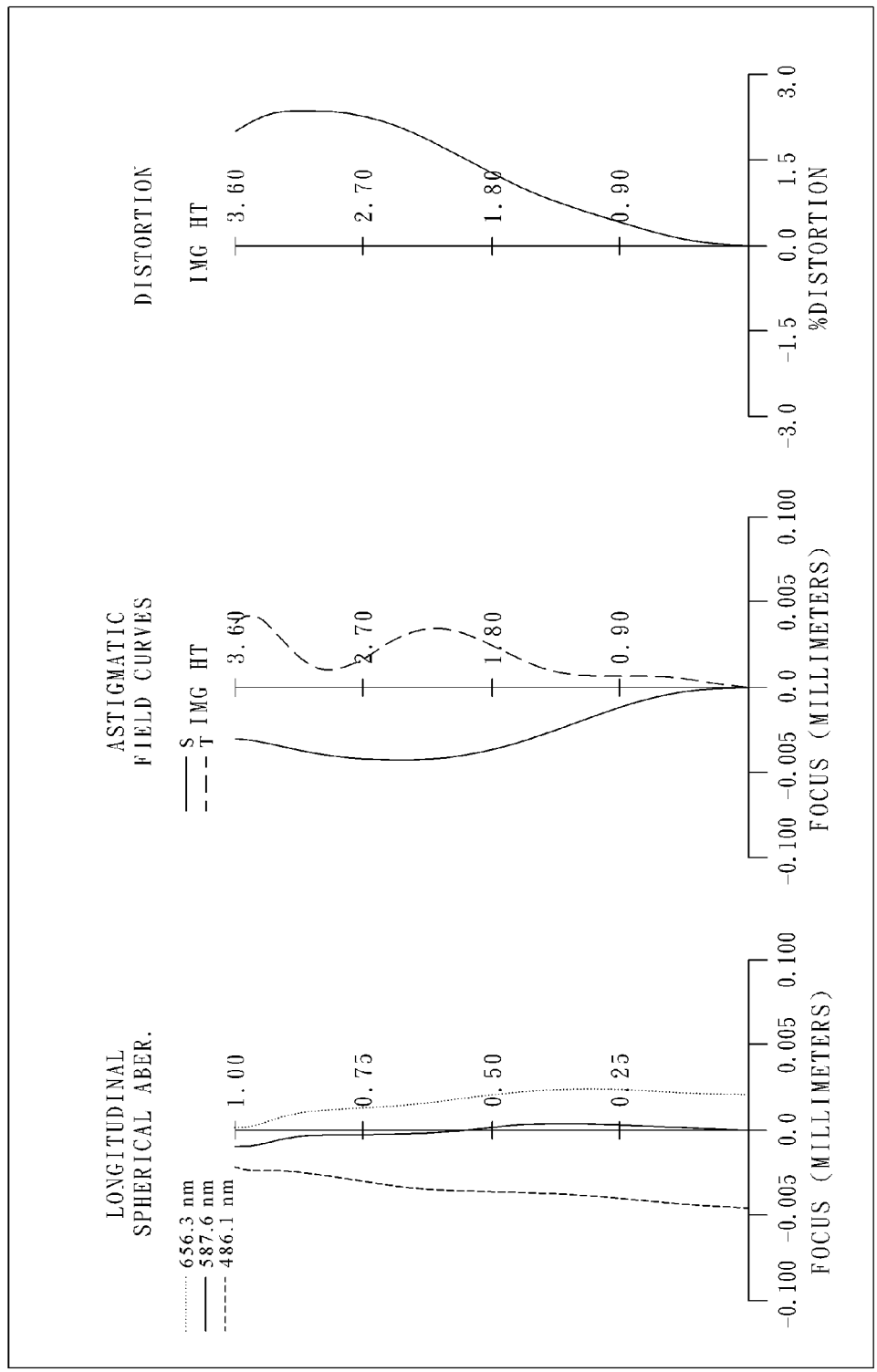
FIG. 6C shows the aberration curves of the sixth embodiment of the present invention.

FIG. 6A shows a photographing optical lens system in accordance with the sixth embodiment of the present invention, FIG. 6B shows the image-side surface characteristics of the fourth lens element of the sixth embodiment of the present invention, and FIG. 6C shows the aberration curves of the sixth embodiment of the present invention. The photographing optical lens system of the sixth embodiment of the present invention mainly comprises four lens elements with refractive power, in order from an object side to an image side:

a plastic first lens element 610 with negative refractive power having a convex object-side surface 611 at the paraxial region, a concave image-side surface 612 at the paraxial region, and both of the object-side surface 611 and image-side surface 612 thereof being aspheric;

a plastic second lens element 620 with positive refractive power having a concave object-side surface 621 at the paraxial region, a convex image-side surface 622 at the paraxial region, and both of the object-side surface 621 and image-side surface 622 thereof being aspheric;

a plastic third lens element 630 with positive refractive power having a concave object-side surface 631 at the paraxial region, a convex image-side surface 632 at the paraxial region, and both of the object-side surface 631 and image-side surface 632 thereof being aspheric, and a point projected onto the optical axis from a maximum effective diameter position on the image-side surface 632 of the third lens element 630 is closer to the object side than an axial vertex on the object-side surface 631 of the third lens element 630; and a plastic fourth lens element 640 with positive refractive power having a convex object-side surface 641 at the paraxial region, a concave image-side surface 642 at the paraxial region and a convex shape at peripheral region, and both of the object-side surface 641 and image-side surface 642 thereof being aspheric, and a distance in parallel with an optical axis from a point on the image-side surface 642 of the fourth lens element 640 to an axial vertex on the image-side surface 642 of the fourth lens element 640 is Sag42, a height perpendicular to the optical axis from the point on the image-side surface 642 of the fourth lens element 640 to the optical axis is Y, a second derivative of the distance Sag42 with respect to the height Y is DDsag42, and DDsag42 changes from positive to negative or vice versa at least once;

wherein the photographing optical lens system further comprises a stop 600 disposed between the first lens element 610 and the second lens element 620;

the photographing optical lens system further comprises a filter element 650 and a cover glass 660 sequentially disposed between the image-side surface 642 of the fourth lens element 640 and an image plane 670, and the filter element 650 and the cover glass 660 are made of glass and have no influence on the focal length of the photographing optical lens system.

The detailed optical data of the sixth embodiment is shown in TABLE 20, the aspheric surface data is shown in TABLE 21, and the image-side surface 642 characteristics of the fourth lens element 640 is shown in TABLE 22, wherein the units of the curvature radius, the thickness and the focal length are mm, and HFOV is half of the maximal field of view.

TABLE 20

(Embodiment 6)
f = 5.26 mm, Fno = 2.60, HFOV = 33.9 deg.

| Surface # | | Curvature Radius | | Thickness | Material | Refractive Index | Focal Length |
|---|---|---|---|---|---|---|---|
| 0 | Object | Plano | | Infinity | | | |
| 1 | Lens 1 | 3.914 | (ASP) | 1.500 | Plastic | OKP4RX50 1.650 | −20.93 |
| 2 | | 2.580 | (ASP) | 0.281 | | | |
| 3 | Ape. Stop | Plano | | 0.027 | | | |

TABLE 20-continued (Embodiment 6)
f = 5.26 mm, Fno = 2.60, HFOV = 33.9 deg.

| Surface # | | Curvature Radius | | Thickness | Material | | Refractive Index | Focal Length |
|---|---|---|---|---|---|---|---|---|
| 4 | Lens 2 | −100.000 | (ASP) | 0.799 | Plastic | APEL-5514ML | 1.544 | 4.75 |
| 5 | | −2.526 | (ASP) | 1.548 | | | | |
| 6 | Lens 3 | −1.201 | (ASP) | 0.714 | Plastic | ARTON-D4532 | 1.514 | 156.50 |
| 7 | | −1.422 | (ASP) | 0.075 | | | | |
| 8 | Lens 4 | 3.495 | (ASP) | 2.155 | Plastic | APEL-5514ML | 1.544 | 14.19 |
| 9 | | 5.000 | (ASP) | 0.800 | | | | |
| 10 | Filter | Plano | | 0.300 | Glass | HOYA BSC7 | 1.517 | — |
| 11 | | Plano | | 0.500 | | | | |
| 12 | cover | Plano | | 0.400 | Glass | HOYA BSC7 | 1.517 | — |
| 13 | glass | Plano | | 0.385 | | | | |
| 14 | Image | Plano | | — | | | | |

* The reference wavelength is d-line 587.6 nm

TABLE 21

Aspheric Coefficients

| | Surface # | | | |
|---|---|---|---|---|
| | 1 | 2 | 4 | 5 |
| k = | 5.7020E−01 | 4.2853E+00 | 3.0000E+00 | 2.1447E+00 |
| A4 = | 4.6989E−03 | 2.2801E−02 | 9.8563E−03 | 3.7331E−03 |
| A6 = | −3.8993E−04 | −4.0171E−03 | 6.4514E−04 | −9.1640E−03 |
| A8 = | 7.1924E−05 | 5.5281E−03 | −4.9387E−03 | 6.0573E−03 |
| A10 = | −4.3494E−05 | −6.3663E−03 | 3.8598E−03 | −2.1265E−03 |
| A12 = | −1.8163E−05 | 2.1430E−07 | 3.7837E−07 | −5.3160E−03 |
| A14 = | | | | 1.4860E−03 |

| | Surface # | | | |
|---|---|---|---|---|
| | 6 | 7 | 8 | 9 |
| k = | −2.7072E+00 | −1.3201E+00 | −9.1731E+00 | −2.3286E+01 |
| A4 = | −4.7742E−03 | 6.5511E−03 | −1.1955E−02 | −5.8649E−03 |
| A6 = | 7.2215E−03 | −2.9378E−03 | 9.7826E−05 | 8.0160E−05 |
| A8 = | 2.3549E−03 | 5.5288E−04 | −2.9685E−04 | −7.9259E−05 |
| A10 = | −3.9480E−04 | 4.2384E−04 | 7.7340E−05 | 1.0135E−05 |
| A12 = | −4.9658E−05 | 8.8806E−05 | −8.6748E−06 | −5.0743E−07 |
| A14 = | | −2.7772E−05 | | |

TABLE 22

Embodiment 6: Characteristics of the image-side surface of Lens 4

| Y (mm) | Sag42 | Dsag42 | DDsag42 |
|---|---|---|---|
| 0.00 | 0.000 | 0.000 | 0.200 |
| 0.15 | 0.002 | 0.030 | 0.192 |
| 0.31 | 0.009 | 0.058 | 0.171 |
| 0.46 | 0.020 | 0.082 | 0.139 |
| 0.61 | 0.034 | 0.101 | 0.103 |
| 0.77 | 0.051 | 0.114 | 0.065 |
| 0.92 | 0.069 | 0.121 | 0.026 |
| 1.07 | 0.087 | 0.122 | −0.014 |
| 1.23 | 0.106 | 0.116 | −0.056 |
| 1.38 | 0.123 | 0.104 | −0.101 |
| 1.53 | 0.137 | 0.085 | −0.150 |
| 1.69 | 0.148 | 0.058 | −0.206 |
| 1.84 | 0.155 | 0.022 | −0.269 |
| 2.00 | 0.154 | −0.025 | −0.339 |
| 2.15 | 0.146 | −0.083 | −0.419 |
| 2.30 | 0.128 | −0.154 | −0.512 |
| 2.46 | 0.098 | −0.241 | −0.625 |
| 2.61 | 0.053 | −0.348 | −0.777 |
| 2.76 | −0.010 | −0.483 | −0.999 |
| 2.92 | −0.097 | −0.661 | −1.352 |
| 3.07 | −0.216 | −0.909 | −1.935 |

* The optical effective radius of the image-side surface of lens 4 is 3.07 mm

The equation of the aspheric surface profiles of the sixth embodiment has the same form as that of the first embodiment. Moreover, the description of the factors in the relations is as those set forth in the first embodiment, but the values of the relations of the sixth embodiment are listed in the following TABLE 23.

TABLE 23

(Embodiment 6)

| f [mm] | 5.26 | T12/T23 | 0.20 |
|---|---|---|---|
| Fno | 2.60 | R4/f | −0.48 |

TABLE 23-continued (Embodiment 6)

| HFOV [deg.] | 33.9 | |(R5 − R6)/(R5 + R6)| | 0.08 |
|---|---|---|---|
| (N1 * N2)/(N3 * N4) | 1.09 | |f/f3| + |f/f4| | 0.41 |
| CT3/CT1 | 0.48 | SD/TD | 0.75 |

Embodiment 7

Figure 7A:
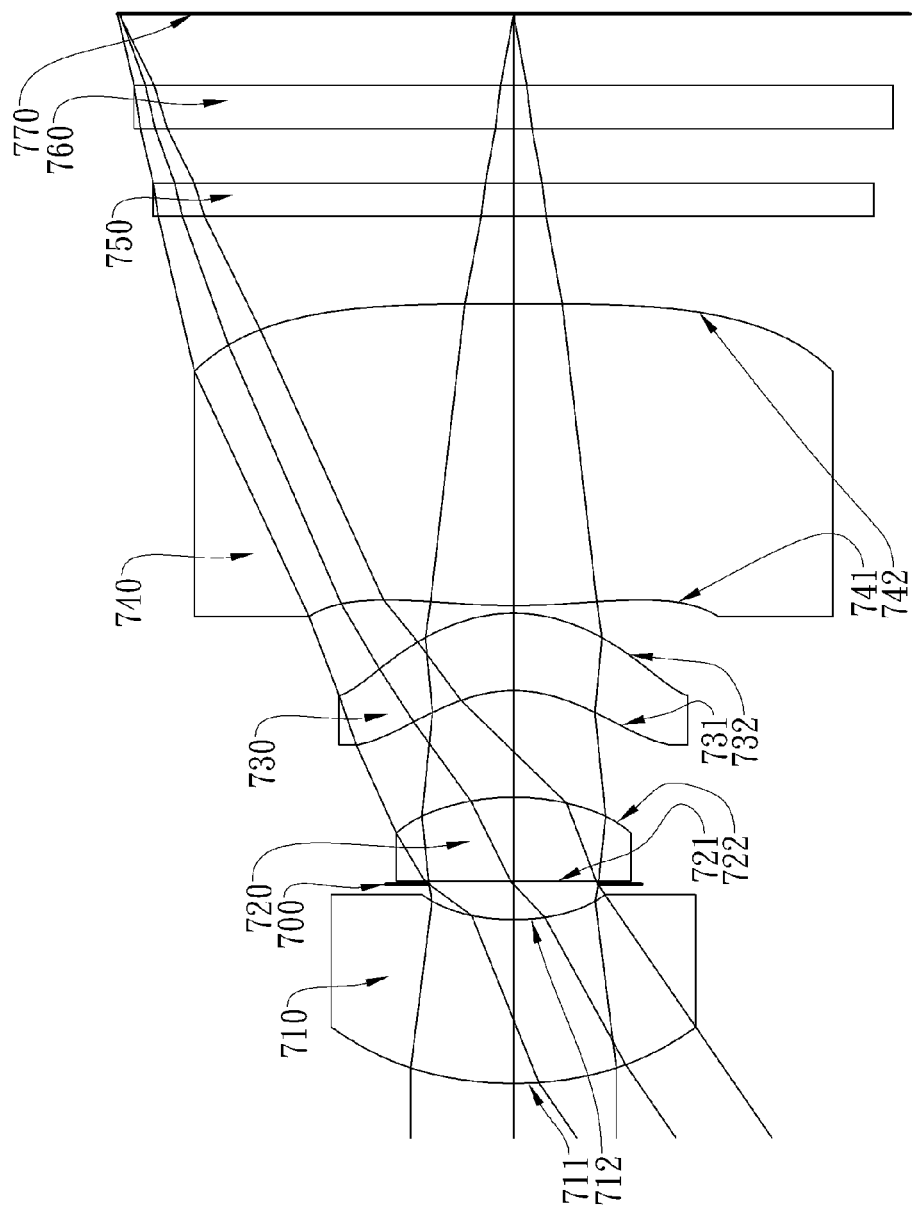
FIG. 7A shows a photographing optical lens system in accordance with the seventh embodiment of the present invention.
Figure 7B:
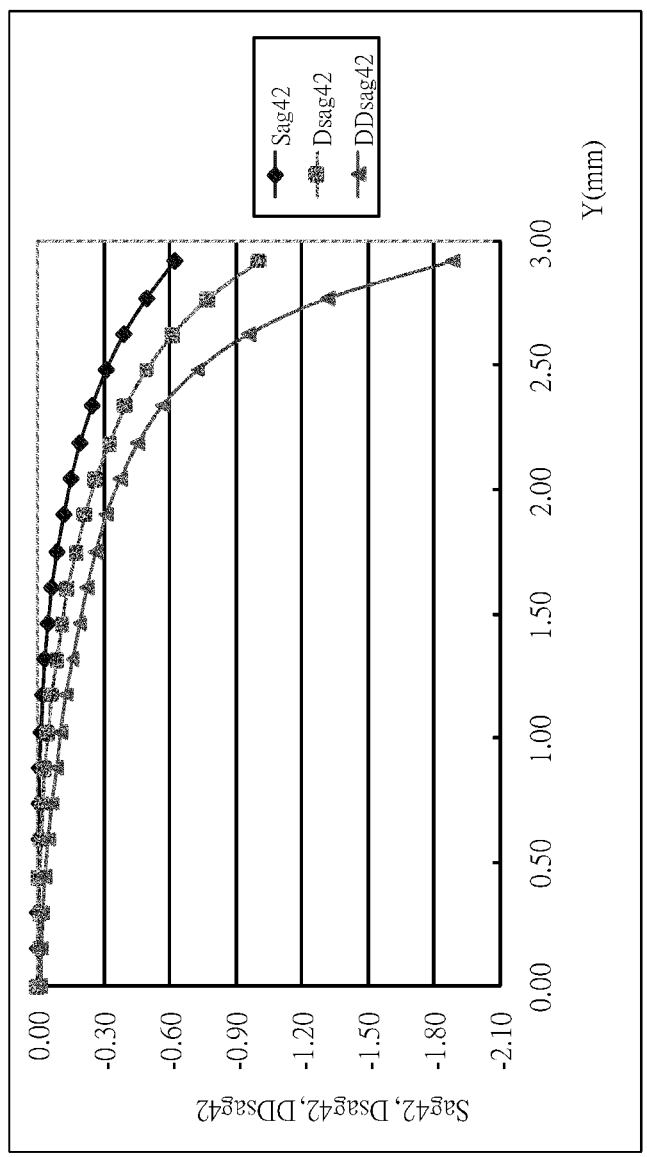
FIG. 7B shows the object-side surface characteristics of the third lens element of the seventh embodiment of the present invention.
Figure 7C:
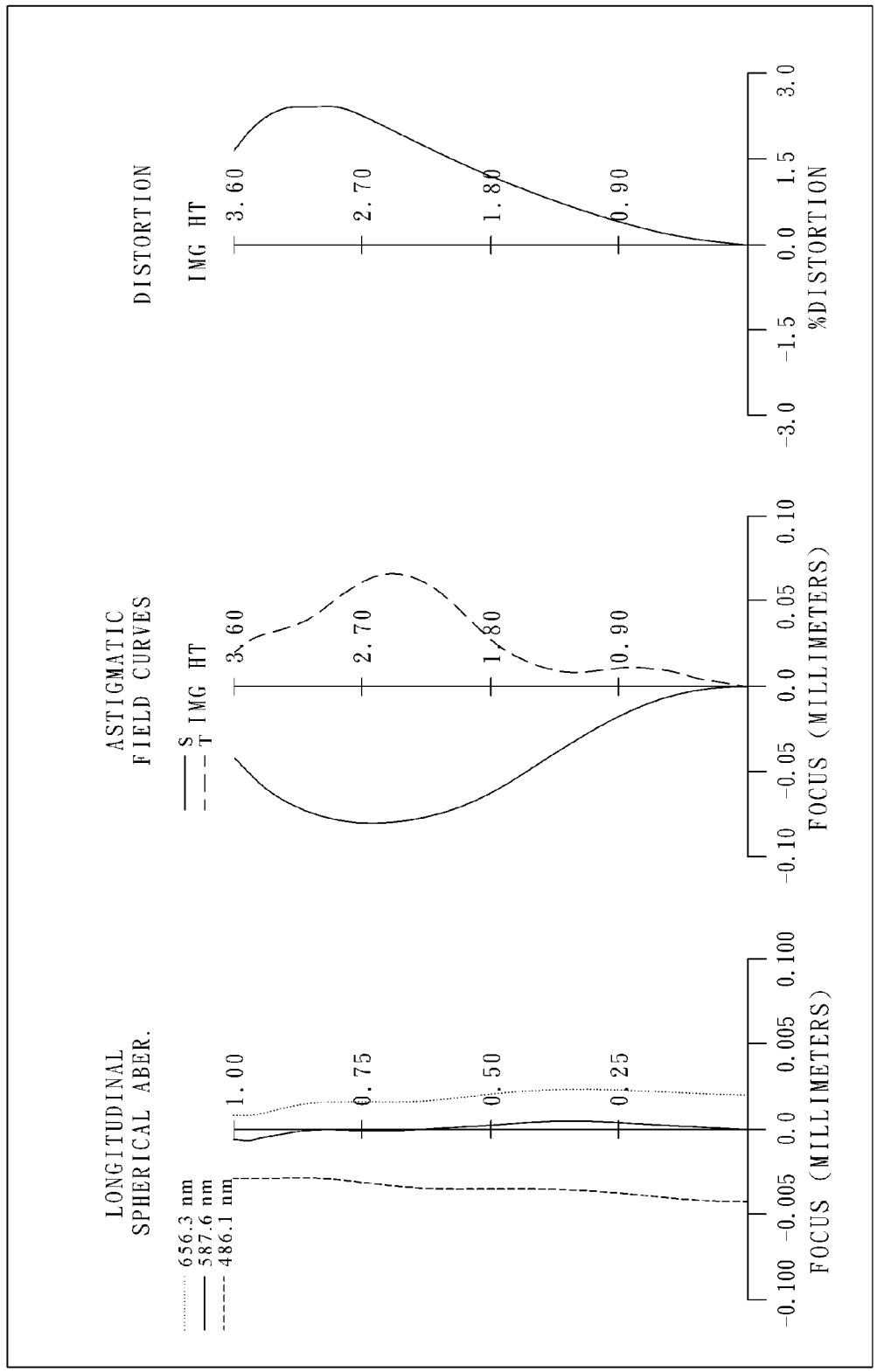
FIG. 7C shows the aberration curves of the seventh embodiment of the present invention.

FIG. 7A shows a photographing optical lens system in accordance with the seventh embodiment of the present invention, FIG. 7B shows the image-side surface characteristics of the fourth lens element of the seventh embodiment of the present invention, and FIG. 7C shows the aberration curves of the seventh embodiment of the present invention. The photographing optical lens system of the seventh embodiment of the present invention mainly comprises four lens elements with refractive power, in order from an object side to an image side:

a plastic first lens element 710 with negative refractive power having a convex object-side surface 711 at the paraxial region, a concave image-side surface 712 at the paraxial region, and both of the object-side surface 711 and image-side surface 712 thereof being aspheric;

a plastic second lens element 720 with positive refractive power having a concave object-side surface 721 at the paraxial region, a convex image-side surface 722 at the paraxial region, and both of the object-side surface 721 and image-side surface 722 thereof being aspheric;

a plastic third lens element 730 with positive refractive power having a concave object-side surface 731 at the paraxial region, a convex image-side surface 732 at the paraxial region, and both of the object-side surface 731 and image-side surface 732 thereof being aspheric, and a point projected onto the optical axis from a maximum effective diameter position on the image-side surface 732 of the third lens element 730 is closer to the object side than an axial vertex on the object-side surface 731 of the third lens element 730; and a plastic fourth lens element 740 with positive refractive power having a convex object-side surface 741 at the paraxial region, a convex image-side surface 742 at the paraxial region and a convex shape at peripheral region, and both of the object-side surface 741 and image-side surface 742 thereof being aspheric, and a distance in parallel with an optical axis from a point on the image-side surface 742 of the fourth lens element 740 to an axial vertex on the image-side surface 742 of the fourth lens element 740 is Sag42, a height perpendicular to the optical axis from the point on the image-side surface 742 of the fourth lens element 740 to the optical axis is Y, a second derivative of the distance Sag42 with respect to the height Y is DDsag42, and DDsag42 does not change from positive to negative or vice versa;

wherein the photographing optical lens system further comprises a stop 700 disposed between the first lens element 710 and the second lens element 720;

the photographing optical lens system further comprises a filter element 750 and a cover glass 760 sequentially disposed between the image-side surface 742 of the fourth lens element 740 and an image plane 770, and the filter element 750 and the cover glass 760 are made of glass and have no influence on the focal length of the photographing optical lens system.

The detailed optical data of the seventh embodiment is shown in TABLE 24, the aspheric surface data is shown in TABLE 25, and the image-side surface 742 characteristics of the fourth lens element 740 is shown in TABLE 26, wherein the units of the curvature radius, the thickness and the focal length are mm, and HFOV is half of the maximal field of view.

TABLE 24

(Embodiment 7)
f = 5.17 mm, Fno = 2.75, HFOV = 34.4 deg.

| Surface # | | Curvature Radius | | Thickness | Material | Refractive Index | Focal Length |
|---|---|---|---|---|---|---|---|
| 0 | Object | Plano | | Infinity | | | |
| 1 | Lens 1 | 3.348 | (ASP) | 1.500 | Plastic OKP4RX50 | 1.650 | −16.35 |
| 2 | | 2.097 | (ASP) | 0.323 | | | |
| 3 | Ape. Stop | Plano | | 0.026 | | | |
| 4 | Lens 2 | −100.000 | (ASP) | 0.769 | Plastic APEL-5514ML | 1.544 | 4.30 |
| 5 | | −2.295 | (ASP) | 0.977 | | | |
| 6 | Lens 3 | −1.222 | (ASP) | 0.708 | Plastic ARTON-D4532 | 1.514 | 152.36 |
| 7 | | −1.440 | (ASP) | 0.070 | | | |
| 8 | Lens 4 | 6.530 | (ASP) | 2.762 | Plastic APEL-5514ML | 1.544 | 11.37 |
| 9 | | −100.000 | (ASP) | 0.800 | | | |
| 10 | Filter | Plano | | 0.300 | Glass HOYA BSC7 | 1.517 | — |
| 11 | | Plano | | 0.500 | | | |
| 12 | cover glass | Plano | | 0.400 | Glass HOYA BSC7 | 1.517 | — |
| 13 | | Plano | | 0.653 | | | |
| 14 | Image | Plano | | — | | | |

* The reference wavelength is d-line 587.6 nm

TABLE 25

Aspheric Coefficients

| Surface # | | | | |
|---|---|---|---|---|
| | 1 | 2 | 4 | 5 |
| k = | 9.3211E−01 | 3.2896E+00 | 3.0000E+00 | 1.6523E+00 |
| A4 = | 6.7198E−03 | 3.5898E−02 | 1.2321E−02 | 3.0122E−03 |
| A6 = | −3.2798E−04 | −1.4243E−02 | 2.5787E−03 | −1.0958E−02 |
| A8 = | −4.9586E−05 | 3.3991E−02 | −1.0344E−02 | 8.7182E−03 |
| A10 = | 1.3463E−04 | −3.4414E−02 | 1.0538E−02 | −1.0762E−02 |
| A12 = | −6.5866E−05 | −1.2306E−05 | 1.2505E−04 | −5.4179E−03 |
| A14 = | | | | 3.3997E−03 |

| Surface # | | | | |
|---|---|---|---|---|
| | 6 | 7 | 8 | 9 |
| k = | −2.4633E+00 | −1.1973E+00 | −2.5049E+01 | −8.1719E+01 |
| A4 = | −2.7776E−03 | 8.0993E−04 | −1.9012E−02 | −8.9827E−03 |
| A6 = | 8.5446E−03 | −6.1230E−03 | −1.3963E−03 | 7.8082E−04 |
| A8 = | 4.3670E−03 | 1.2227E−03 | 1.3271E−04 | −1.3017E−04 |
| A10 = | 1.6945E−04 | 7.6892E−04 | 1.0601E−04 | 1.1126E−05 |
| A12 = | −3.7981E−04 | 1.7683E−04 | −4.2426E−05 | −5.7801E−07 |
| A14 = | | −6.4398E−06 | | |

TABLE 26

Embodiment 7: Characteristics of the image-side surface of Lens 4

| Y (mm) | Sag42 | Dsag42 | DDsag42 |
|---|---|---|---|
| 0.00 | 0.000 | 0.000 | −0.010 |
| 0.15 | 0.000 | −0.002 | −0.012 |
| 0.29 | 0.000 | −0.004 | −0.019 |
| 0.44 | −0.001 | −0.007 | −0.030 |
| 0.58 | −0.003 | −0.013 | −0.044 |
| 0.73 | −0.005 | −0.020 | −0.062 |
| 0.88 | −0.009 | −0.031 | −0.082 |
| 1.02 | −0.014 | −0.044 | −0.104 |
| 1.17 | −0.022 | −0.061 | −0.129 |
| 1.31 | −0.032 | −0.082 | −0.156 |
| 1.46 | −0.046 | −0.107 | −0.186 |
| 1.61 | −0.064 | −0.137 | −0.221 |
| 1.75 | −0.086 | −0.172 | −0.262 |
| 1.90 | −0.114 | −0.214 | −0.312 |
| 2.04 | −0.149 | −0.264 | −0.374 |
| 2.19 | −0.192 | −0.324 | −0.455 |
| 2.34 | −0.244 | −0.398 | −0.565 |
| 2.48 | −0.309 | −0.491 | −0.722 |
| 2.63 | −0.389 | −0.612 | −0.956 |
| 2.77 | −0.489 | −0.776 | −1.318 |
| 2.92 | −0.619 | −1.007 | −1.884 |

* The optical effective radius of the image-side surface of lens 4 is 2.92 mm

The equation of the aspheric surface profiles of the seventh embodiment has the same form as that of the first embodiment. Moreover, the description of the factors in the relations is as those set forth in the first embodiment, but the values of the relations of the seventh embodiment are listed in the following TABLE 27.

TABLE 27

(Embodiment 7)

| f [mm] | 5.17 | T12/T23 | 0.36 |
|---|---|---|---|
| Fno | 2.75 | R4/f | −0.44 |
| HFOV [deg.] | 34.4 | \|(R5 − R6)/(R5 + R6)\| | 0.08 |
| (N1 * N2)/(N3 * N4) | 1.09 | \|f/f3\| + \|f/f4\| | 0.49 |
| CT3/CT1 | 0.47 | SD/TD | 0.74 |

Embodiment 8

Figure 8A:
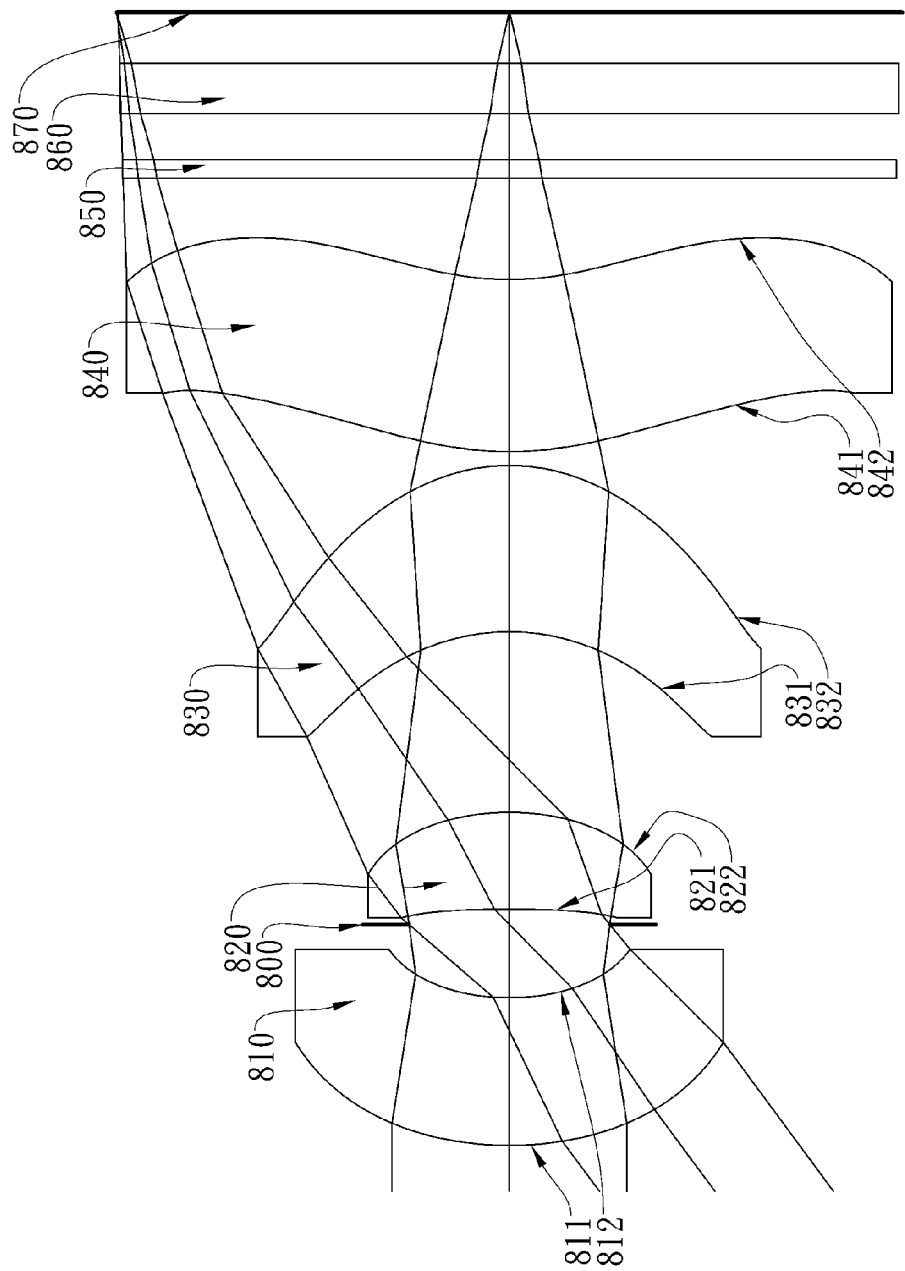
FIG. 8A shows a photographing optical lens system in accordance with the eighth embodiment of the present invention.
Figure 8B:
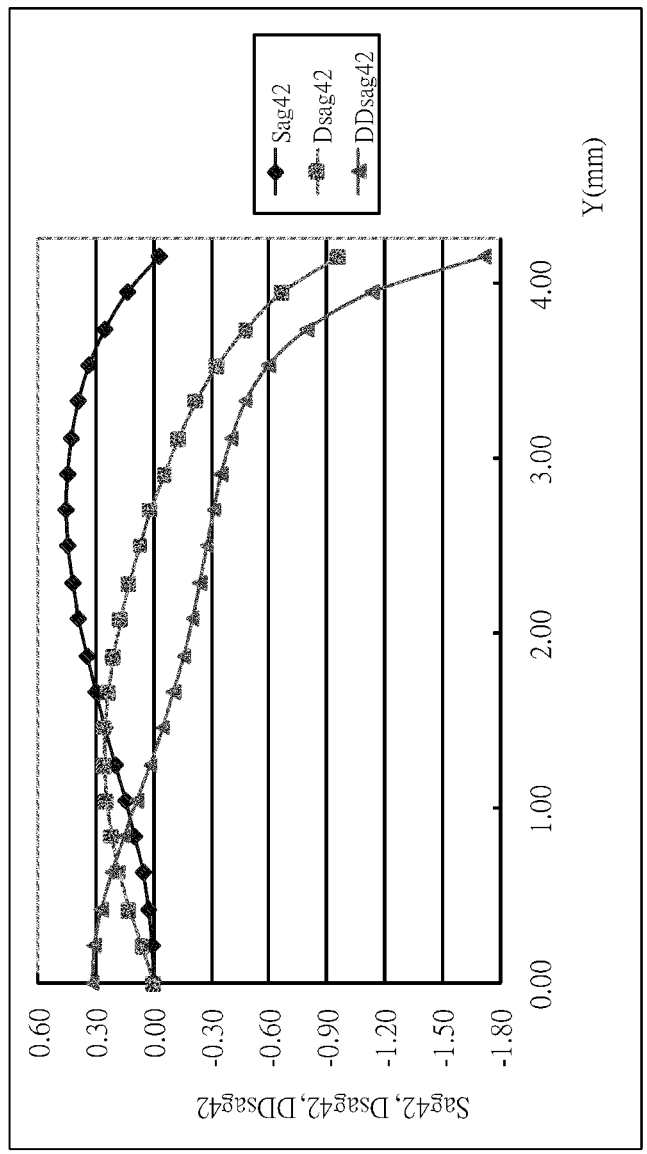
FIG. 8B shows the object-side surface characteristics of the third lens element of the eighth embodiment of the present invention.
Figure 8C:
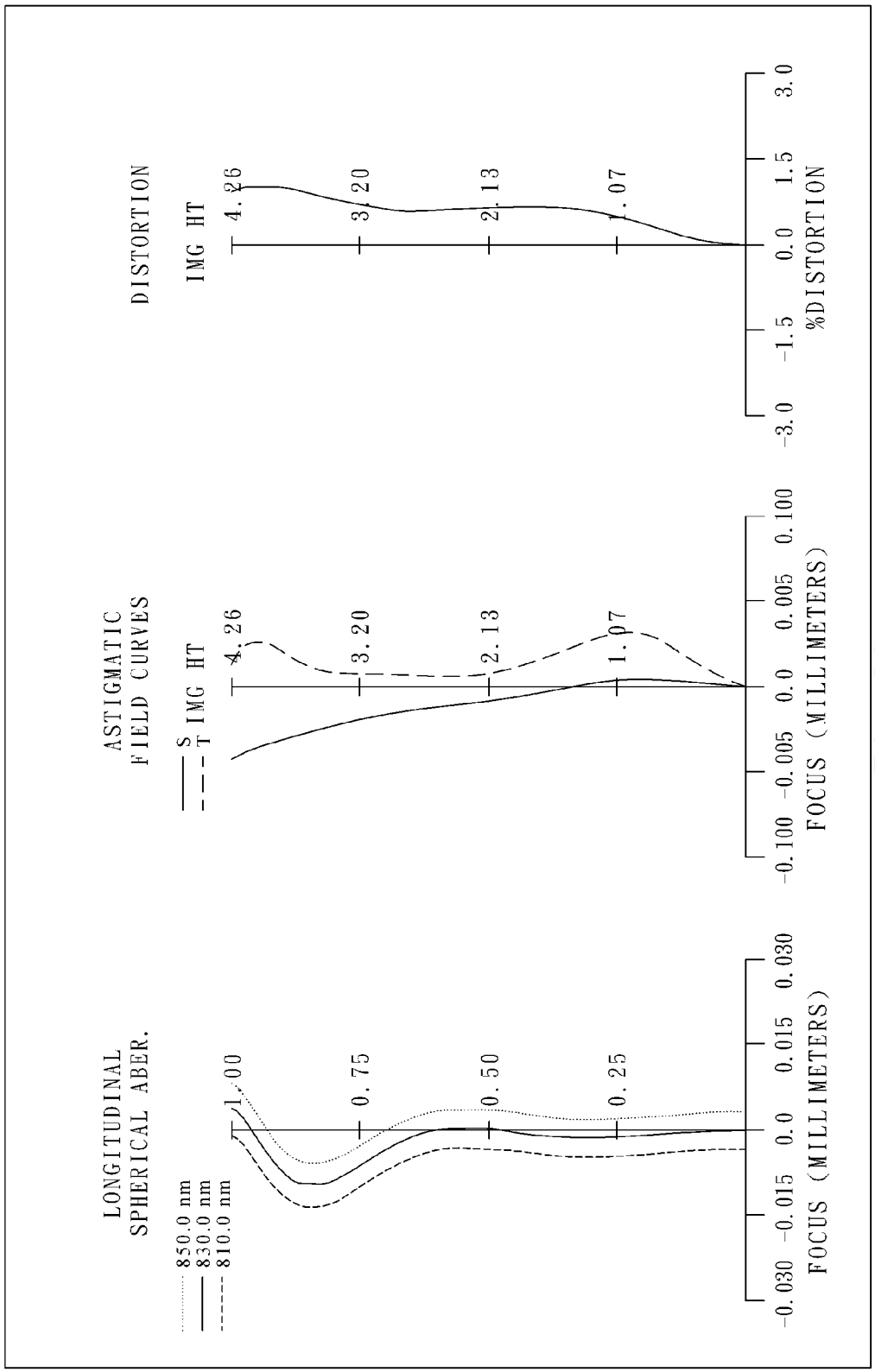
FIG. 8C shows the aberration curves of the eighth embodiment of the present invention.

FIG. 8A shows a photographing optical lens system in accordance with the eighth embodiment of the present invention, FIG. 8B shows the image-side surface characteristics of the fourth lens element of the eighth embodiment of the present invention, and FIG. 8C shows the aberration curves of the eighth embodiment of the present invention. The photographing optical lens system of the eighth embodiment of the present invention mainly comprises four lens elements with refractive power, in order from an object side to an image side:

a plastic first lens element 810 with negative refractive power having a convex object-side surface 811 at the paraxial region, a concave image-side surface 812 at the paraxial region, and both of the object-side surface 811 and image-side surface 812 thereof being aspheric;

a plastic second lens element 820 with positive refractive power having a concave object-side surface 821 at the paraxial region, a convex image-side surface 822 at the paraxial region, and both of the object-side surface 821 and image-side surface 822 thereof being aspheric;

a plastic third lens element 830 with positive refractive power having a concave object-side surface 831 at the paraxial region, a convex image-side surface 832 at the paraxial region, and both of the object-side surface 831 and image-side surface 832 thereof being aspheric, and a point projected onto the optical axis from a maximum effective diameter position on the image-side surface 832 of the third lens element 830 is closer to the object side than an axial vertex on the object-side surface 831 of the third lens element 830; and a plastic fourth lens element 840 with positive refractive power having a convex object-side surface 841 at the paraxial region, a concave image-side surface 842 at the paraxial region and a convex shape at peripheral region, and both of the object-side surface 841 and image-side surface 842 thereof being aspheric, and a distance in parallel with an optical axis from a point on the image-side surface 842 of the fourth lens element 840 to an axial vertex on the image-side surface 842 of the fourth lens element 840 is Sag42, a height perpendicular to the optical axis from the point on the image-side surface 842 of the fourth lens element 840 to the optical axis is Y, a second derivative of the distance Sag42 with respect to the height Y is DDsag42, and DDsag42 changes from positive to negative or vice versa at least once;

wherein the photographing optical lens system further comprises a stop 800 disposed between the first lens element 810 and the second lens element 820;

the photographing optical lens system further comprises a filter element 850 and a cover glass 860 sequentially disposed between the image-side surface 842 of the fourth lens element 840 and an image plane 870, and the filter element 850 and the cover glass 860 are made of glass and have no influence on the focal length of the photographing optical lens system.

The detailed optical data of the eighth embodiment is shown in TABLE 28, the aspheric surface data is shown in TABLE 29, and the image-side surface 842 characteristics of the fourth lens element 840 is shown in TABLE 30, wherein the units of the curvature radius, the thickness and the focal length are mm, and HFOV is half of the maximal field of view.

TABLE 28

(Embodiment 8)
f = 5.73 mm, Fno = 2.25, HFOV = 36.4 deg.

| Surface # | | Curvature Radius | | Thickness | Material | | Refractive Index | Focal Length |
|---|---|---|---|---|---|---|---|---|
| 0 | Object | Plano | | Infinity | | | | |
| 1 | Lens 1 | 3.693 | (ASP) | 1.603 | Plastic | MGC EP5000 | 1.616 | −24.10 |
| 2 | | 2.468 | (ASP) | 0.796 | | | | |
| 3 | Ape. Stop | Plano | | 0.165 | | | | |
| 4 | Lens 2 | −13.657 | (ASP) | 1.051 | Plastic | APEL-5514ML | 1.537 | 6.21 |
| 5 | | −2.752 | (ASP) | 1.961 | | | | |
| 6 | Lens 3 | −2.304 | (ASP) | 1.805 | Plastic | APEL-5514ML | 1.537 | 10.71 |
| 7 | | −2.095 | (ASP) | 0.150 | | | | |
| 8 | Lens 4 | 3.610 | (ASP) | 1.868 | Plastic | ZEONEX F52R | 1.527 | 163.89 |
| 9 | | 3.094 | (ASP) | 1.100 | | | | |
| 10 | Filter | Plano | | 0.200 | Glass | HOYA BSC7 | 1.510 | — |
| 11 | | Plano | | 0.500 | | | | |
| 12 | cover glass | Plano | | 0.550 | Glass | HOYA BSC7 | 1.510 | — |
| 13 | | Plano | | 0.551 | | | | |
| 14 | Image | Plano | | — | | | | |

\* The photographing optical lens system can be applied in an infrared wavelength range; the reference wavelength is 830 nm

TABLE 29

Aspheric Coefficients

| | Surface # | | | |
|---|---|---|---|---|
| | 1 | 2 | 4 | 5 |
| k = | 9.7080E−01 | 1.9280E+00 | −1.0000E+01 | 1.7299E+00 |
| A4 = | 2.7620E−03 | 8.8446E−03 | −1.2453E−02 | −3.9702E−03 |
| A6 = | 1.9923E−04 | 9.9763E−04 | −8.8320E−03 | −2.4973E−03 |
| A8 = | −1.9915E−05 | −1.7040E−04 | 5.4101E−03 | 2.4061E−03 |
| A10 = | 7.0704E−06 | 4.9723E−04 | −3.8070E−03 | −2.4763E−03 |
| A12 = | | | 2.4397E−05 | 1.1297E−03 |
| A14 = | | | | −2.2007E−04 |

| | Surface # | | | |
|---|---|---|---|---|
| | 6 | 7 | 8 | 9 |
| k = | −4.1115E+00 | −5.8736E−01 | −3.3288E+00 | −4.5169E+00 |
| A4 = | −2.6080E−02 | 5.4457E−04 | −7.8191E−03 | −9.8685E−03 |
| A6 = | 1.7603E−03 | 1.2623E−04 | 7.1084E−04 | 6.3707E−04 |
| A8 = | −7.4891E−04 | 5.8518E−05 | −4.7892E−05 | −3.4041E−05 |
| A10 = | 1.4557E−04 | −2.0808E−05 | 2.0846E−06 | 1.1792E−06 |
| A12 = | | 1.6786E−06 | −5.4790E−08 | −2.4773E−08 |
| A14 = | | 1.8240E−07 | | |

TABLE 30

Embodiment 8: Characteristics of the image-side surface of Lens 4

| Y (mm) | Sag42 | Dsag42 | DDsag42 |
|---|---|---|---|
| 0.00 | 0.000 | 0.000 | 0.323 |
| 0.21 | 0.007 | 0.066 | 0.311 |
| 0.42 | 0.027 | 0.127 | 0.275 |
| 0.62 | 0.059 | 0.179 | 0.222 |
| 0.83 | 0.101 | 0.219 | 0.157 |
| 1.04 | 0.149 | 0.244 | 0.088 |
| 1.25 | 0.201 | 0.255 | 0.020 |
| 1.45 | 0.254 | 0.253 | −0.044 |
| 1.66 | 0.305 | 0.237 | −0.102 |
| 1.87 | 0.352 | 0.211 | −0.154 |
| 2.08 | 0.392 | 0.174 | −0.198 |
| 2.28 | 0.423 | 0.129 | −0.237 |
| 2.49 | 0.445 | 0.076 | −0.273 |
| 2.70 | 0.454 | 0.016 | −0.308 |
| 2.91 | 0.451 | −0.052 | −0.347 |
| 3.11 | 0.432 | −0.129 | −0.398 |
| 3.32 | 0.396 | −0.219 | −0.474 |
| 3.53 | 0.340 | −0.329 | −0.595 |
| 3.74 | 0.257 | −0.471 | −0.796 |
| 3.94 | 0.140 | −0.669 | −1.138 |
| 4.15 | −0.027 | −0.960 | −1.715 |

* The optical effective radius of the image-side surface of lens 4 is 4.15 mm

The equation of the aspheric surface profiles of the eighth embodiment has the same form as that of the first embodiment. Moreover, the description of the factors in the relations is as those set forth in the first embodiment, but the values of the relations of the eighth embodiment are listed in the following TABLE 31.

TABLE 31

(Embodiment 8)

| f [mm] | 5.73 | T12/T23 | 0.49 |
|---|---|---|---|
| Fno | 2.25 | R4/f | −0.48 |
| HFOV [deg.] | 36.4 | |(R5 − R6)/(R5 + R6)| | 0.05 |
| (N1 * N2)/(N3 * N4) | 1.06 | |f/f3| + |f/f4| | 0.57 |
| CT3/CT1 | 1.13 | SD/TD | 0.74 |

It is to be noted that TABLES 1-31 show different data of the different embodiments; however, the data of the different embodiments are obtained from experiments. Therefore, any photographing optical lens system of the same structure is considered to be within the scope of the present invention even if it uses different data. The embodiments depicted above and the appended drawings are exemplary and are not intended to limit the scope of the present invention.

What is claimed is:

1. A photographing optical lens system, in order from an object side to an image side comprising:
   a first lens element with negative refractive power having a convex object-side surface at paraxial region and a concave image-side surface at paraxial region;
   a second lens element with positive refractive power having a concave object-side surface at paraxial region and a convex image-side surface at paraxial region;
   a third lens element with positive refractive power having a concave object-side surface at paraxial region and a convex image-side surface at paraxial region; and
   a fourth lens element with positive refractive power having a convex object-side surface at paraxial region, a concave image-side surface at paraxial region and a convex shape at peripheral region, and both of the object-side and image-side surfaces thereof being aspheric;
   wherein the lens elements of the photographing optical lens system with refractive power are only the first lens element, the second lens element, the third lens element, and the fourth lens element;
   wherein an axial distance between the first lens element and the second lens element is T12, an axial distance between the second lens element and the third lens element is T23, a focal length of the photographing optical lens system is f, a focal length of the third lens element is f3, a focal length of the fourth lens element is f4, a refractive index of the first lens element is N1, a refractive index of the second lens element is N2, a refractive index of the third lens element is N3, a refractive index of the fourth lens element is N4, and they satisfy the following relations:

$0.05 < T12/T23 < 0.52;$ $0 < |f/f3| + |f/f4| < 0.80;$ and $0.80 < (N1*N2)/(N3*N4) < 1.20.$ 2. The photographing optical lens system according to claim 1, wherein the refractive index of the first lens element is N1, the refractive index of the second lens element is N2, the refractive index of the third lens element is N3, the refractive index of the fourth lens element is N4, and they satisfy the following relation:

$0.90 < (N1*N2)/(N3*N4) < 1.14.$

3. The photographing optical lens system according to claim 1, wherein a curvature radius of the image-side surface of the second lens element is R4, the focal length of the photographing optical lens system is f, and they satisfy the following relation:

$-0.80 < R4/f < 0.$

4. The photographing optical lens system according to claim 1, wherein a curvature radius of the object-side surface of the third lens element is R5, a curvature radius of the image-side surface of the third lens element is R6, and they satisfy the following relation:

$0 < |(R5 - R6)/(R5 + R6)| < 0.25.$

5. The photographing optical lens system according to claim 1, wherein the photographing optical lens system further comprises a stop disposed between the first lens element and the second lens element, an axial distance between the stop and the image-side surface of the fourth lens element is SD, an axial distance between the object-side surface of the first lens element and the image-side surface of the fourth lens element is TD, and they satisfy the following relation:

$0.65 < SD/TD < 0.90.$

6. The photographing optical lens system according to claim 5, wherein a central thickness of the third lens element is CT3, a central thickness of the first lens element is CT1, and they satisfy the following relation:

$0.20 < CT3/CT1 < 2.0.$

7. The photographing optical lens system according to claim 6, wherein a point projected onto an optical axis from a maximum effective diameter position on the image-side surface of the third lens element is closer to the object side than an axial vertex on the object-side surface of the third lens element.

8. The photographing optical lens system according to claim 5, wherein the axial distance between the first lens element and the second lens element is T12, the axial distance between the second lens element and the third lens element is T23, and they satisfy the following relations:

$0.12 < T12/T23 < 0.40$.

9. The photographing optical lens system according to claim 5, wherein the photographing optical lens system is used for optical wavelengths ranging from 780 nm to 950 nm.

10. A photographing optical lens system, in order from an object side to an image side comprising:
   a first lens element with negative refractive power;
   a second lens element with positive refractive power having a convex image-side surface at paraxial region;
   a third lens element with positive refractive power having a concave object-side surface at paraxial region and a convex image-side surface at paraxial region; and
   a fourth lens element with positive refractive power having a convex object-side surface at paraxial region, a concave image-side surface at paraxial region and a convex shape at peripheral region, and both of the object-side and image-side surfaces thereof being aspheric;
   wherein the lens elements of the photographing optical lens system with refractive power are only the first lens element, the second lens element, the third lens element, and the fourth lens element;
   wherein an axial distance between the first lens element and the second lens element is T12, an axial distance between the second lens element and the third lens element is T23, a curvature radius of the image-side surface of the second lens element is R4, a focal length of the photographing optical lens system is f, a focal length of the third lens element is f3, a focal length of the fourth lens element is f4, a refractive index of the first lens element is N1, a refractive index of the second lens element is N2, a refractive index of the third lens element is N3, a refractive index of the fourth lens element is N4, and they satisfy the following relations:

$0.05 < T12/T23 < 0.52$;

$-1.5 < R4/f < 0$;

$0 < |f/f3| + |f/f4| < 0.80$; and $0.80 < (N1*N2)/(N3*N4) < 1.20$.

11. The photographing optical lens system according to claim 10, wherein the first lens element has a convex object-side surface at paraxial region and a concave image-side surface at paraxial region.

12. The photographing optical lens system according to claim 11, wherein the curvature radius of the image-side surface of the second lens element is R4, the focal length of the photographing optical lens system is f, and they satisfy the following relation:

$-0.80 < R4/f < 0$.

13. The photographing optical lens system according to claim 12, wherein a curvature radius of the object-side surface of the third lens element is R5, a curvature radius of the image-side surface of the third lens element is R6, and they satisfy the following relation:

$0 < |(R5-R6)/(R5+R6)| < 0.25$.

14. The photographing optical lens system according to claim 12, wherein the photographing optical lens system is used for optical wavelengths ranging from 780 nm to 950 nm.

15. The photographing optical lens system according to claim 11, wherein a central thickness of the third lens element is CT3, a central thickness of the first lens element is CT1, and they satisfy the following relation:

$0.20 < CT3/CT1 < 2.0$.

16. The photographing optical lens system according to claim 11, wherein the photographing optical lens system further comprises a stop disposed between the first lens element and the second lens element, an axial distance between the stop and the image-side surface of the fourth lens element is SD, an axial distance between the object-side surface of the first lens element and the image-side surface of the fourth lens element is TD, and they satisfy the following relation:

$0.65 < SD/TD < 0.90$.

17. A photographing optical lens system, in order from an object side to an image side comprising:
   a first lens element with negative refractive power having a convex object-side surface at paraxial region and a concave image-side surface at paraxial region;
   a second lens element with positive refractive power having a convex image-side surface at paraxial region;
   a third lens element with positive refractive power having a concave object-side surface at paraxial region and a convex image-side surface at paraxial region; and
   a fourth lens element with positive refractive power having a convex object-side surface at paraxial region, and both of the object-side and image-side surfaces thereof being aspheric, a distance in parallel with an optical axis from a point on the image-side surface of the fourth lens element to an axial vertex on the image-side surface of the fourth lens element is Sag42, a second derivative of the distance Sag42 with respect to a height perpendicular to the optical axis from the point on the image-side surface of the fourth lens element to the optical axis is DDsag42, and DDsag42 changes from positive to negative or vice versa at least once;
   wherein the lens elements of the photographing optical lens system with refractive power are only the first lens element, the second lens element, the third lens element, and the fourth lens element;
   wherein an axial distance between the first lens element and the second lens element is T12, an axial distance between the second lens element and the third lens element is T23, a curvature radius of the image-side surface of the second lens element is R4, a focal length of the photographing optical lens system is f, a focal length of the third lens element is f3, a focal length of the fourth lens element is f4, a refractive index of the first lens element is N1, a refractive index of the second lens element is N2, a refractive index of the third lens element is N3, a refractive index of the fourth lens element is N4, and they satisfy the following relations:

$0.05 < T12/T23 < 0.75$;

$-1.5 < R4/f < 0$;

$0 < |f/f3| + |f/f4| < 0.80$; and $0.80 < (N1*N2)/(N3*N4) < 1.2$.

18. The photographing optical lens system according to claim 17, wherein the photographing optical lens system further comprises a stop disposed between the first lens element and the second lens element, an axial distance between the stop and the image-side surface of the fourth lens element is SD, an axial distance between the object-side surface of the first lens element and the image-side surface of the fourth lens element is TD, and they satisfy the following relation:

$0.65<SD/TD<0.90.$

19. The photographing optical lens system according to claim 17, wherein the refractive index of the first lens element is N1, the refractive index of the second lens element is N2, the refractive index of the third lens element is N3, the refractive index of the fourth lens element is N4, and they satisfy the following relation:

$0.90<(N1*N2)/(N3*N4)<1.14.$

20. The photographing optical lens system according to claim 17, wherein a curvature radius of the object-side surface of the third lens element is R5, a curvature radius of the image-side surface of the third lens element is R6, and they satisfy the following relation:

$0<|(R5-R6)/(R5+R6)|<0.25.$

21. The photographing optical lens system according to claim 17, wherein the photographing optical lens system is used for optical wavelengths ranging from 780 nm to 950 nm.

22. A photographing optical lens system, in order from an object side to an image side comprising:
- a first lens element with negative refractive power having a convex object-side surface at paraxial region and a concave image-side surface at paraxial region;
- a second lens element with positive refractive power having a convex image-side surface at paraxial region;
- a third lens element with positive refractive power having a concave object-side surface at paraxial region and a convex image-side surface at paraxial region; and
- a fourth lens element with positive refractive power having a convex object-side surface at paraxial region, a concave image-side surface at paraxial region and a convex shape at peripheral region, and both of the object-side and image-side surfaces thereof being aspheric;
- wherein the lens elements of the photographing optical lens system with refractive power are only the first lens element, the second lens element, the third lens element, and the fourth lens element;
- wherein the photographing optical lens system is used for optical wavelengths ranging from 780 nm to 950 nm;
- wherein a focal length of the photographing optical lens system is f, a focal length of the third lens element is f3, a focal length of the fourth lens element is f4, a refractive index of the first lens element is N1, a refractive index of the second lens element is N2, a refractive index of the third lens element is N3, a refractive index of the fourth lens element is N4, and they satisfy the following relations:

$0<|f/f3|+|f/f4|<0.80;$ and $0.80<(N1*N2)/(N3*N4)<1.20.$

23. The photographing optical lens system according to claim 22, wherein an axial distance between the first lens element and the second lens element is T12, an axial distance between the second lens element and the third lens element is T23, and they satisfy the following relations:

$0.05<T12/T23<0.52.$

24. The photographing optical lens system according to claim 22, wherein a central thickness of the third lens element is CT3, a central thickness of the first lens element is CT1, and they satisfy the following relation:

$0.20<CT3/CT1<2.0.$

25. The photographing optical lens system according to claim 22, wherein a curvature radius of the object-side surface of the third lens element is R5, a curvature radius of the image-side surface of the third lens element is R6, and they satisfy the following relation:

$0<|(R5-R6)/(R5+R6)|<0.25.$

26. The photographing optical lens system according to claim 22, wherein the photographing optical lens system further comprises a stop disposed between the first lens element and the second lens element, an axial distance between the stop and the image-side surface of the fourth lens element is SD, an axial distance between the object-side surface of the first lens element and the image-side surface of the fourth lens element is TD, and they satisfy the following relation:

$0.65<SD/TD<0.90.$

27. The photographing optical lens system according to claim 26, wherein a distance in parallel with an optical axis from a point on the image-side surface of the fourth lens element to an axial vertex on the image-side surface of the fourth lens element is Sag42, a second derivative of the distance Sag42 with respect to a height perpendicular to the optical axis from the point on the image-side surface of the fourth lens element to the optical axis is DDsag42, and DDsag42 changes from positive to negative or vice versa at least once.

28. The photographing optical lens system according to claim 26, wherein a curvature radius of the image-side surface of the second lens element is R4, the focal length of the photographing optical lens system is f, and they satisfy the following relation:

$-0.80<R4/f<0.$

* * * * *